United States Patent [19]
Goldstein et al.

[11] Patent Number: 6,128,325
[45] Date of Patent: Oct. 3, 2000

[54] LASERS PUMPED BY THERMALLY STIMULATED PHOTON EMITTER

[75] Inventors: Mark K. Goldstein, Del Mar; Larry Deshazer, Newport Beach; Aleksandr S. Kushch, Poway, all of Calif.

[73] Assignee: Quantum Group, Inc., San Diego, Calif.

[21] Appl. No.: 09/005,115

[22] Filed: Jan. 9, 1998

Related U.S. Application Data

[60] Provisional application No. 60/034,739, Jan. 10, 1997.

[51] Int. Cl.[7] .......................... H01S 3/0955; H01S 3/0937
[52] U.S. Cl. ................................ 372/73; 372/70; 372/77; 372/78
[58] Field of Search .............................. 372/69–73, 76–79

[56] References Cited

U.S. PATENT DOCUMENTS

| | | | |
|---|---|---|---|
| 4,016,500 | 4/1977 | Pilloff | 372/77 X |
| 4,348,765 | 9/1982 | Oettinger | 372/78 |
| 4,776,895 | 10/1988 | Goldstein | 136/253 |
| 4,793,799 | 12/1988 | Goldstein et al. | 431/79 |
| 4,906,178 | 3/1990 | Goldstein et al. | 431/79 |
| 5,281,131 | 1/1994 | Goldstein | 431/253 |
| 5,356,487 | 10/1994 | Goldstein et al. | 136/253 |
| 5,400,765 | 3/1995 | Goldstein et al. | 126/39 J |
| 5,500,054 | 3/1996 | Goldstein | 136/253 |
| 5,503,685 | 4/1996 | Goldstein | 136/253 |
| 5,617,444 | 4/1997 | Houde-Walter | 372/77 |

*Primary Examiner*—John D. Lee
*Attorney, Agent, or Firm*—Christie, Parker & Hale, LLP

[57] ABSTRACT

A system for thermally stimulating a laser emissive device comprises a thermal generating device, a photon emissive device that is capable of generating photons upon exposure to thermal energy, a laser emissive source, and an optical waveguide interposed between the photon emissive source and laser emissive source to direct photons to the laser emissive source to effect photon stimulation of the same. The waveguide may be in the form of a light pipe comprising the photon emissive material, which material is disposed within the thermal energy source. The photon emissive material is selected to produce a specific wavelength of photons that are collected within and directed through the optical waveguide to a laser rod. The photons routed to the laser rod stimulate a specific wavelength laser emission. If desired, the system can also be used with more than one target, e.g., more than one laser device, or a photovoltaic cell to produce electricity.

27 Claims, 16 Drawing Sheets

LASERS PUMPED BY THERMALLY STIMULATED PHOTON EMITTER

RELATING TO COPENDING PATENT APPLICATION

This patent application claims priority under 35 U.S.C. §119(e) of U.S. Provisional Patent Application Ser. No. 60/034,739 that was filed on Jan. 10, 1997.

FIELD OF THE INVENTION

The present invention relates to means for efficiently producing laser action from thermal energy inputs without the need to use electricity to operate an optical pumping system such as a flash lamp or laser diode array. The thermal energy generated photons incorporated within light pipe systems, which systems are capable of producing selected photons, direct some or most of such selected photons directly to pump a laser Optionally, the light pipe system provides some photons to photovoltaic (PV) cells to provide electric power to the laser system as well as other systems or other needs so that no other electric generation is required, except a very small rechargeable battery to provide ease of ignition and information storage during long dormancy periods.

BACKGROUND OF THE INVENTION

Solid state lasers developed rapidly during the year since the first ruby laser in the 1950's. (T. H. Maiman—Nature 187, 493 (1960)) In 1964 the Nd doped YAG was discovered (J. E. Geusic, H. M. Marcos and L. G. Van Uitert (App. Phys. Lett. 4, 182 [1964]). This Nd-YAG technology is in wide use today and is being continuously improved. By the 1970's solid state lasers entered a period of mass commercialization. Today, many new solid state lasers are based on rare earth and other elements such as uranium, chromium, samarium, ytterbium, thulium, holmium, erbium, and many others are being developed (A. A. Kaminskii "Crystalline Lasers: Physical Processes and operating Schemes", CRC Press 1996).

Many lasers are used by aircraft, tanks, vehicles as well as foot soldiers. Most of the these lasers are either pumped by flash lamps or laser diodes which are bulky. These processes are inefficient and expensive as well. Therefore, there is a need for a low cost, lighter weight, efficient laser. This patent describes lasers which use a thermally stimulated photon emitting light pipe as the pumping device, which may be heated by any heat source such as combustion, nuclear, radioisotopic, chemical, solar or the like.

A variety of different combustion systems useful as a heat source for the thermally stimulated photon emitting light pipe or "light pipe" can be designed depending on specific application. Some combustion systems can employ an emissive matrix combustor having the beneficial characteristics of producing a high power density and providing a high radiant output heat source. Emissive matrix combustion systems provide an extremely high power density (up to 30 W/cm$^2$) and have a radiant output of about 50% of total chemical energy that is released in a combustion process.

Another approach can be to design a vortex combustion system, having high power density and extended residence time of hot combustion products, in a light pipe containing section that increases the thermal energy transfer from the exhaust to the light pipe.

It is also possible to fabricate a microchannel combustor having a high power specific density (up to 100 W/cm$^3$) and having a highly extended light pipe area, or combination of these or other combustion technologies such as open flame combustors, surface combustors, and the like.

Superemissive insulation that covers internal shell of the combustion chamber is an additional source of the narrow band photons which can transfer energy through the light pipe to the laser. Superemissive materials can be described as materials that, when heated to a threshold temperature, includes one or more electrons that jump to a different electron energy level in quantum increments which causes the emission of ultraviolet, visible or infrared radiation in a wavelength band related to the atom's inner electron shell vacancy. Emitted radiation produced as a result of such electron transition is often within a narrow band and can, therefore, be absorbed efficiently by a laser system, such as Nd doped YVO$_4$ or YAG.

Thermally-stimulated superemissive materials produce radiation in relatively concentrated narrow special bands compared to blackbody or greybody emitters which typically exhibit a broadband thermal emission such as from a flash lamp. As a result of the concentrated, narrow spectral band, photons emitted from the superemitter and focused to the laser system one would expect greater efficiency than that generated by a blackbody emitter operating at the same heat flux. However, a blackbody emitter may be constructed to emit visible or infrared radiation in a narrow spectral band by using one or more band-pass filters interposed between the superemitter and the target laser or other device. Photon filtering, however, is not energy efficient. On the other hand, laser diode can emit in a very narrow band, but must be powered by power conditioned electric systems which are expensive, inefficient, heavy and bulky.

Photon generators that use superemitters to emit radiation and, therefore, generate photons are well-known and are disclosed in U.S. Pat. Nos. 4,776,895, 4,793,799, 4,906,178. For example, such a photon generator includes a porous ceramic burner in the shape of a cylinder having an annular passage extending therethrough. A superemitting fiber layer is disposed along the inside wall of the ceramic burner and is made from a high temperature fiber or coating comprising, for example, pure or doped oxides of uranium, thorium, ytterbium, aluminum, gallium, yttrium, erbium, holmium, zirconium, chromium or other high temperature oxides. When subjected to thermal energy, the fiber layer emits radiation that is directed to a central axis running along the annular passage of the cylindrical burner.

As the ceramic burner is heated, the superemissive fiber layer emits radiation that can be filtered, by use of a cylindrical hollow filter disposed within the ceramic burner, to emit radiation at a selected bandwidth. The radiation passing through the filter is directed to the surface of an optical cable that is disposed centrally within the annular passage of the ceramic burner and filter. The photons generated by the fiber layer are, therefore, directed onto the optical cable and are channeled through the cable to each cable end, which is directed to a target comprising a photovoltaic cell. Accordingly, the photons generated by the superemissive fiber layer within the ceramic burner are directed through the optical cable into the photovoltaic cell, and converted to electricity.

The embodiments of the photon generator disclosed in earlier identified U.S. patents and U.S. patent applications do not promote the most efficient generation and collection of photons to pump and power laser systems. In the above-discussed embodiments, the emission of photons is effected through application of thermal energy to the body, which passes through the body of thermal conduction to the superemissive material. Accordingly, a large amount of thermal energy is wasted through the mechanism of thermal conduction. Additionally, the photons emitted by the superemissive material are not collected efficiently, as relatively weaker photons, or photons that are emitted from a distance further away from the optical waveguide than other emitted photons, are not collected within the waveguide. Accordingly, many of the photons generated by the superemitter are not collected by the optical waveguide and, therefore, are not directed to the target(s).

It is, therefore, desirable that a device be constructed to facilitate the economic generation and collection of selected photons, and be capable of directing them to a laser to optically pump the laser. It is desired that the device be simple to construct and be easily adaptable for use with a number of different thermal generation sources. It is desirable that the device be configured to accommodate use with one or more target laser systems and also to generate electricity by conversion of photons to electricity by means of one or more photovoltaic cells. It is desirable that the device be constructed in such a manner as to eliminate or minimize the effects of thermal shock on the cell. It is desirable that the device be capable of being manufactured from conventional materials using current manufacturing techniques. It is also desirable for this unit to be low cost, light weight and compact as well as energy efficient. The ability to operate directly from the available heat source without the need for electric power and power conditioning is very desirable.

SUMMARY OF THE INVENTION

Devices constructed according to principles of this invention incorporate superemitters into or onto waveguides or light pipes, and heat them preferably at a distance from a laser system (e.g., the solid state laser rod). Photons generated from such heating source are carried and directed to a laser within the thermally stimulated photon emitting light pipe, cr waveguides attached to the light pipe, to produce laser action in any laser, e.g., neodymium YAG.

The system, prepared according to principles of this invention, comprises a thermal energy source, an photon emissive source exposed to the thermal energy source, a laser emissive source exposed to the photons emitted by the photon emissive source, and an optical waveguide interposed between the photon emissive source and the laser emissive source. In the simplest system, the waveguide is in the form of a light pipe is heated by a thermal source such as a flame, radiant source, or hot gas from a high-temperature gas cooled connected reactor (HTGR). The light pipe comprises a photon emissive material that is designed to emit photon upon exposure to thermal energy and is connected or closely coupled to the laser emissive source such that photons generated by the thermal energy applied to the light pipe are used to optically pump the laser.

There are three primary types of light pipes. The first light pipe type comprises a waveguide with superemitter imbedded within it such as a doped crystal, doped glass, rare earth garnets and aluminates, transparent ceramics or glass ceramics containing superemitters.

In the second case, the superemitters (such as Yb, Ho and Er oxides or other appropriate materials) are coated or diffused onto the waveguide (e.g., glasses, sapphires, YAGs, silicon dioxides as well as other waveguide materials).

A third method to produce a light pipe involves multiple coatings onto a waveguide (or light pipe) with more than one material. The coating(s) may be added by means of a sol-gel or other coating process.

Another method would be some combination of the above three (3) methods.

The doped, coated or other superemissive waveguide (light pipe) is heated by some thermal source until the desired photon flux or power is obtained, as long as the temperature does not exceed the material limitations. The heat causes the superemitters to emit narrow wavelength band(s) of photons having intensities proportional to the thermal energy applied, mass and area of emitter and temperature of the heat sources as well as the heat flux applied, thermal conductivity, and thermal transfer mechanism. A portion of the thermally excited photons produced within the waveguide at less than the critical angle will not escape except at the waveguide ends where the laser targets (such as laser rods, mirror or PV cells or combinations thereof) may be placed. One or both ends of the light pipe may be placed at substantial distance from the heat source such that the ends may be cool and direct an intense focused beam of selected photons onto any target(s). These targets require photons or selected wavelength photons delivered by means of an optical connection or close proximity. Thus reducing the need to cool the lasers and/or PV cells and reducing other adverse effects such as from nuclear or thermal radiation, thermal shock, and corrosion provide substantial economic, performance, and engineering advantages for many military and civilian applications.

The light pipe produces selected wavelength photons to pump the particular laser lines when heated, at which time the selected photons may be focused onto a laser target directly or transferred via an optical coupling to a waveguide system which in turn directs (and may further filter and select) the photons to the target as illustrated in FIGS. 1 through 29.

Light pipe pumped laser systems described in this invention meet all of the desired features and/or criteria described above and are particularly useful in both military and civilian applications.

DETAILED DESCRIPTION OF THE INVENTION

Figure 1:
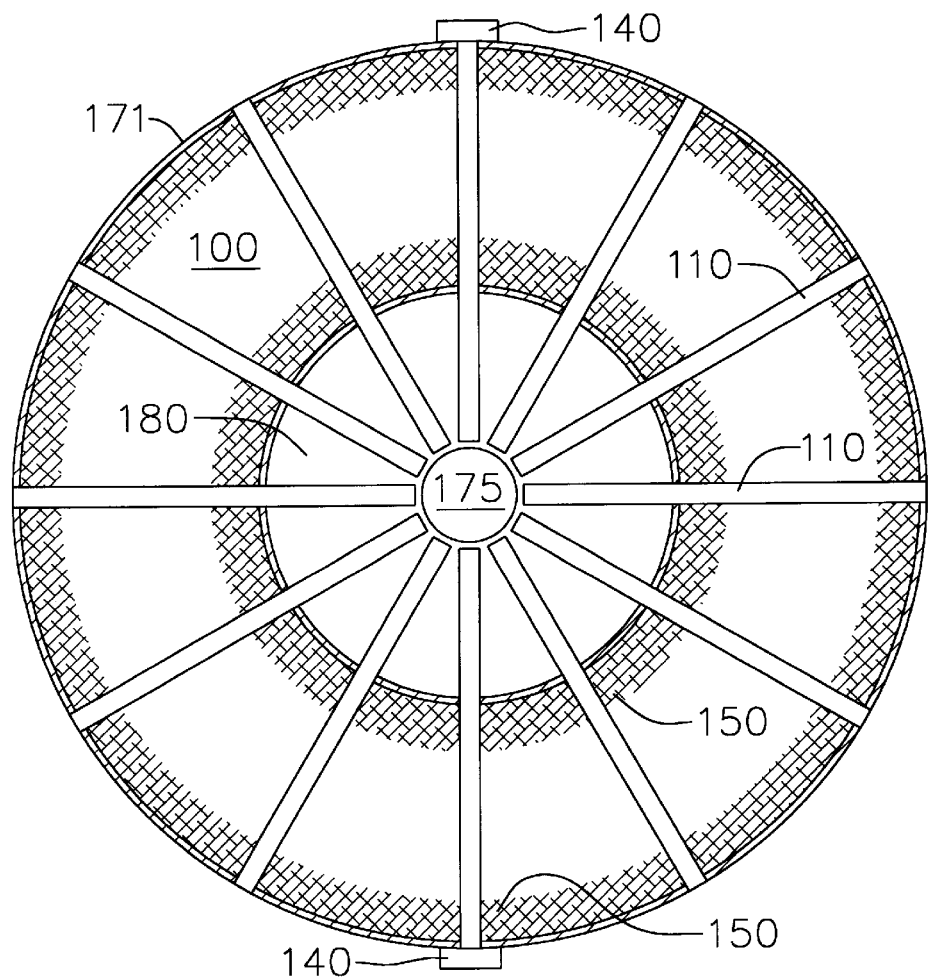
FIG. 1 is a radial cross-sectional end view of a thermally stimulated photon emitting light pipe pumped laser.

There are a number of ways of producing superemitting light pipes, several of which are discussed in two recent U.S. patents; U.S. Pat. Nos. 5,500,054 and 5,503,685, which are incorporated herein by reference.

This patent describes a process of producing laser action directly from thermal inputs to the light pipe and in turn pumping the laser. This invention is also based on work disclosed in U.S. Pat. Nos. 4,776,895, 4,793,799 and 4,906,178, which are also incorporated herein by reference. There are many books and review papers describing laser technology such as the textbook *Lasers* by Anthony E. Siegman (University Science Books Mill Valley, Calif., 1986) which describes the theory and state of the art of lasers.

The electricity producing laser device of this invention comprises a thermally stimulated superemissive waveguide that delivers selected wavelength photons to a laser cavity as well as to at least one PV cell attached to one end of a light pipe. Light pipe waveguide systems of this invention may contain emitter materials such as rare earths or other materials with inner electron shell vacancies that can be thermally stimulated to emit narrow band(s) of photons in desired range for performing useful tasks such as the production of electrical energy. The device may use blackbody or gray body radiation and a means to enhance its selectivity such as a filter reflector system to exclude of reduce certain wavelengths from the emitter beam.

A first embodiment of a photon generating waveguide of this invention is similar to the light pipe in that each construction comprises use of an outer body (e.g., which can be made up of one or more layers) that when heated emits useful photons to pump a laser system. It is the superemitter material contained in the light pipe, e.g., disposed in the outer body, that effects emission of radiation when thermal energy is applied. An optical waveguide is used to collect and channel photons generated by the light pipe to pump one or more laser system target.

A second embodiment incorporates the superemissive material within the waveguide. For example rare earth garnets or aluminates, doped sapphires, or any waveguide material containing a superemitter that emits narrow band radiation for any reason can be employed.

A third embodiment of the invention may be any combination on the first and the second method, i.e., a waveguide which incorporates superemitters and has one or more coating containing at least some superemitters within the coating outer bodies.

It is known that different superemitters have maximum efficiencies of converting thermal energy to photon emissions at different temperatures. For example, ytterbia superemitter has a maximum efficiency at about 3000 K, erbia at 2000 K, holmia and neodymia at 1450–1500 K. In order to increase an overall light pipe laser pumping system efficiency it is possible to design a device comprising a light pipe fabricated as an integrated structure of at least two superemissive sections. Each superemissive section in this case is located in an appropriate region of a heat source where temperature levels will provide for maximum efficiency for each superemitter. Having such integrated light pipe construction, the photon emission output is centered at several peaks. For example, with a ytterbia/erbia/holmia light pipe it is expected to have IR emission centered at 0.98 $\mu$m, 1.55 and 2 $\mu$m.

If an integrated superemissive section is located in the middle of the light pipe and two waveguides are extended out of the heat source, there is opportunity to apply an optical reflector which will reflect some photons (for example photons with 1.55 and 2 $\mu$m) to one end of the light pipe, so only IR with 0.98 $\mu$m will pump the laser rod which is faced to this end of the light pipe. The other light pipe end can supply the rest of energy in broader wavelength to the other target, which can be another laser or broad band PV converter or tandem type PV cell, so the light pipe system will pump laser and generate an electricity to power laser or other equipment.

Another embodiment of light pipe laser pumping/power generating system with a multi-superemissive sections can be fabricated as a set of light pipes where at least one light pipe is made as a rod and at least one light pipe is made as a coil. Each light pipe can include one superemissive section located in an appropriate temperature region inside of the heat source. Such a device is capable of pumping several lasers, or of pumping the lasers and also producing electricity to power a laser or other system.

This invention includes waveguides of various shapes and sizes employed to direct the photons onto the target(s). The problem of previous devices is that they make it difficult to get the photons to enter the waveguide and many photons were therefore unable to be collected efficiently. The present improvement solves the previous problem by generating most of the photons within the waveguide or light pipe system and/or recycling the photons emitted outside the waveguide. The thermal energy, however, must be transmitted from the heat source (e.g., combustion) to the light pipe by means of conduction, convection and radiation. The use of nuclear and isotopic power allows the incorporation of the heating elements within or attached to the light pipe. Nuclear energy can also be applied to the light pipe by means of hot gases. The use of solar energy can be applied by conduction from a black body collector in intimate contact with the light pipe. On the other hand, it is possible to place certain photon absorbers within the waveguide so as to collect solar photons and transfer their energy to the superemitter materials by one of several mechanisms which are not yet fully understood. One such method may be similar to the various laser energy transfer process as described in a earlier paper entitled "Diode Pumped Solid State Lasers," presented at InterOpto 93, International Opto-electronics Exhibition, Tokyo, Japan, Jul. 16, 1993, by T. E. Bonham, L. G. DeShazer, G. Dube, R. E. Juhala, C. J. Kennedy, J. S. Whiteley, and R. A. Williams, or in the book by Kaminskii referenced below.

FIG. 1, Example 1 illustrates a laser using a light pipe photon pump system comprising a superemitter such as ytterbium garnet ($Yb_3Al_5O_{12}$) that is heated by a thermal source, for example an advanced emissive combustion system 100 previously described in an earlier patent application Ser. No. 08/237,306 filed May 3, 1994 (U.S. Pat. No. 5,711,661); Ser. No. 08/482,217 filed Jun. 7, 1995; Ser. No. 60/011,323 filed Feb. 8, 1996; and Ser. No. 08/645,105 May 13, 1996, all of which are herein incorporated by reference.

The end view of a typical light pipe pumped laser comprising a number of light pipes 110 is depicted in FIG. 1. If at least one component of the light pipe 110 is made from a material having an inner electron shell hole, such as a rare earth element or other selective emitter (e.g., chromium incorporated into a transparent host (such as sapphire), ceria incorporated into thoria, and many others as described in U.S. Pat. Nos. 4,776,895; 4,793,799; 4,906,178; 5,281,131; 5,356,487; 5,400,765; 5,503,685; and 5,500,054 (all herein incorporated by reference), then the light pipe 110 will emit selected photons to a laser cavity target causing the laser to emit laser light. Currently, laser diode and flash lamp photon pumping are the standard methods of pumping most solid state lasers, and particularly those lasers of interest for most military and civil applications described in the background section.

Figure 3:
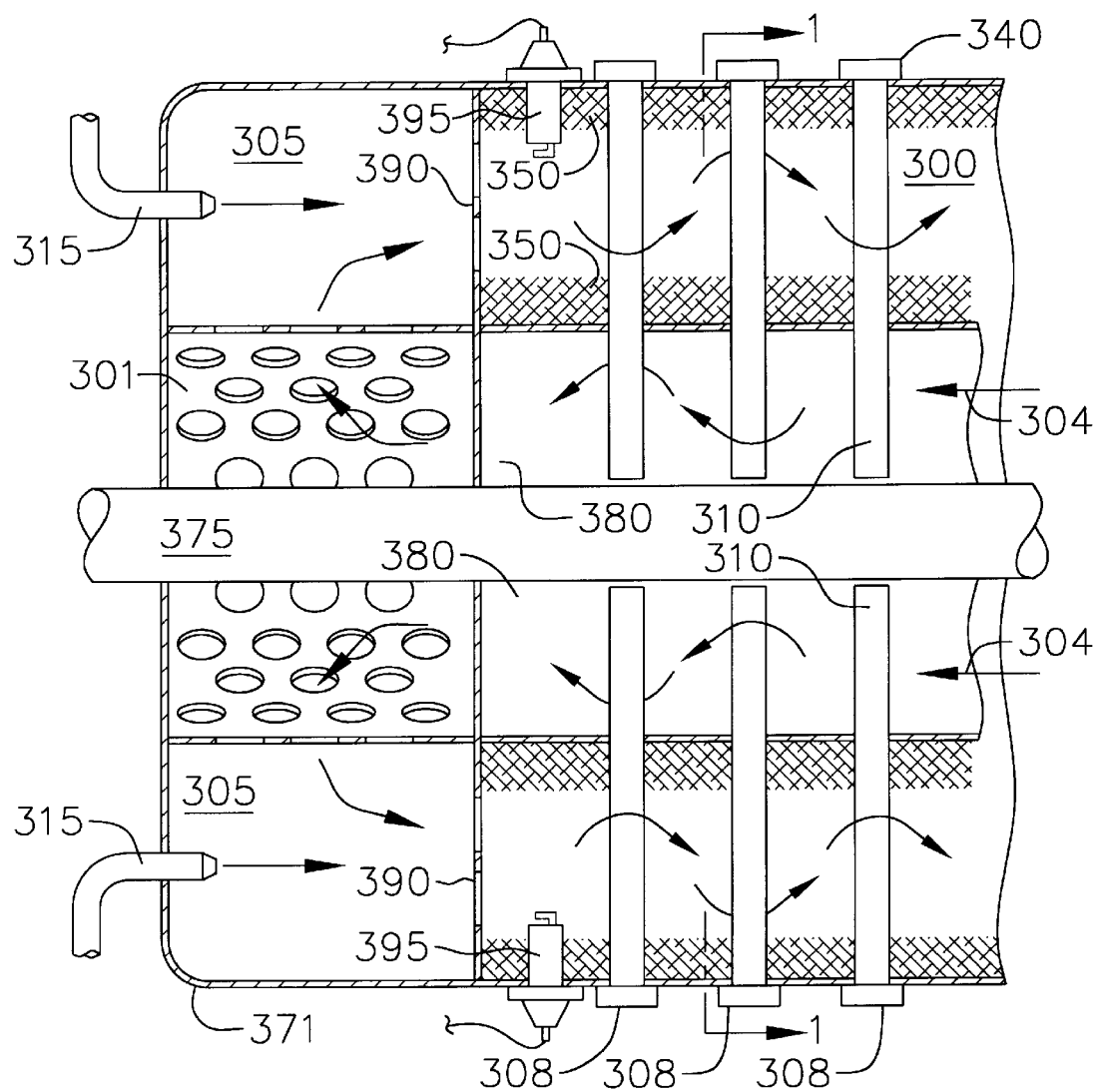
FIG. 3 is a cross-sectional side view of a light pipe pumped laser.

Example 1 of a fossil fueled Emissive matrix/Light pipe pumped laser comprises one or more light pipes 110 placed within a combustion zone 100, as shown in FIGS. 1 and 3. The light pipes 110 may also be placed radially around a laser rod 175 as shown in FIG. 1. In the case where the heat source is combustion, the combustion heated emissive elements 110 may include transparent oxides, glass, ceramic or other material coated with superemitters materials or may incorporate the superemissive material within a transparent waveguide material such as YbAG, ErAG, YAG, silicon dioxide, glass, alumina or sapphire (not shown) or combinations of the above with at least one superemissive material incorporated within or coated onto or both.

A portion of the light pipe proximate the laser rod 175 are disposed within an air chamber 180 of the combustor that serves to cool the light pipes by thermal convection. Alternatively, the chamber 180 can be filled with a cooling fluid to achieve light pipe cooling. Additionally, a photovoltaic cell 140 can be attached to the end of a light pipe opposite the laser emissive source for purposes of producing electricity.

Figure 2:
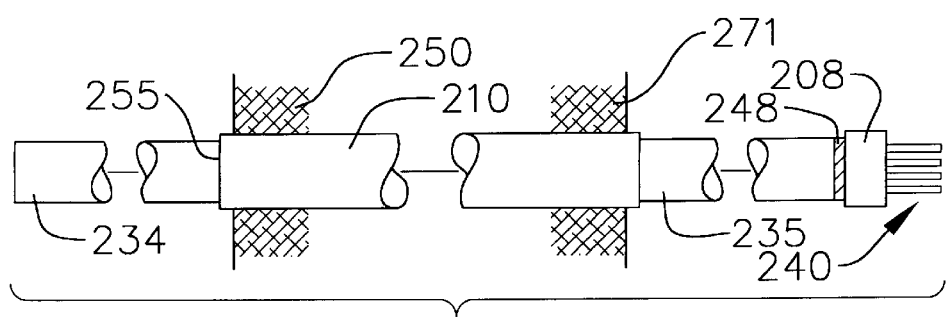
FIG. 2 is a side elevational view of a light pipe with one end used for thermal photo voltaic purposes and the other end used for laser pumping.

FIG. 2, Example 2 of lasers pumped by light pipe of this invention of this invention illustrates a light pipe 210 connected to an optical waveguide 234 as by means of an optical connection such as a diffusion bond 255 and the like. The Optical waveguide material 234 comprises an optically transparent host that does not absorb the selected photons such as YAG and may be attached to both end as shown in FIG. 2. A second outer connected waveguide material 235 can be attached to a mirror on the far end (not shown) or to a photovoltaic (PV) cell system 240 consisting of a PV cell 208 and a cooling means (not shown). A band pass filter 248 may be used to reduce the out of band photons striking the PV cell, which decreases the temperature of the PV cell 240 and thus improves efficiency.

The light pipe in FIG. 2 may alternately comprise a transparent core such as sapphire or YAG (not shown) which is coated with a superemissive layer (not shown), and which in turn may be coated with a cladding (not shown) having an index of refraction sufficiently different from the emissive layer.

FIG. 3 is a side view of a laser 375 being pumped by a number of light pipe prepared according to this invention. Example 1 depicts the light pipe pumped laser using light pipe in one geometric form, but it is by no means a limitation of this invention to a single geometry. The light pipe pumped laser may be constructed in any form such as a cylinder which is illustrated in FIGS. 1 and 3. Superemissive felt material 150 may be applied to either side of the annual shell 171 as depicted in FIG. 1, and as depicted as 350 applied to the annular shell 371 in FIG. 3. Referring to FIG. 3, air 304 is blown into an inner chamber 380 by an air transport means (not shown). Some of the heat from the laser and the light pipe system is transferred to the air which then passes through a porous layer 301 such as a perforated metal tube, and then mixes with fuel 315 such as natural gas, JP-8, DF-2, propane, or butane in a mixing chamber 305. The mixture of air and fuel then passes through a burner head 390 and into a combustion chamber 300 where combustion takes place and is stabilized by the emissive matrix structure to produce a nearly uniform temperature over the light pipe system 110 and 310 in FIGS. 1 and 3, respectively. Alternately the fuel and air may be mixed in the combustion chamber 300 by means of some mechanism such as touch heads, nozzles, injectors, atomizers or other methods (not shown). The fuel and air is ignited in the combustion chamber by an ignitor 395. Photovoltaic cells 340 and 308 can be attached to ends of the light pipe opposite from the laser rod if it is desired that electricity by generated by the system as well.

Figure 4:
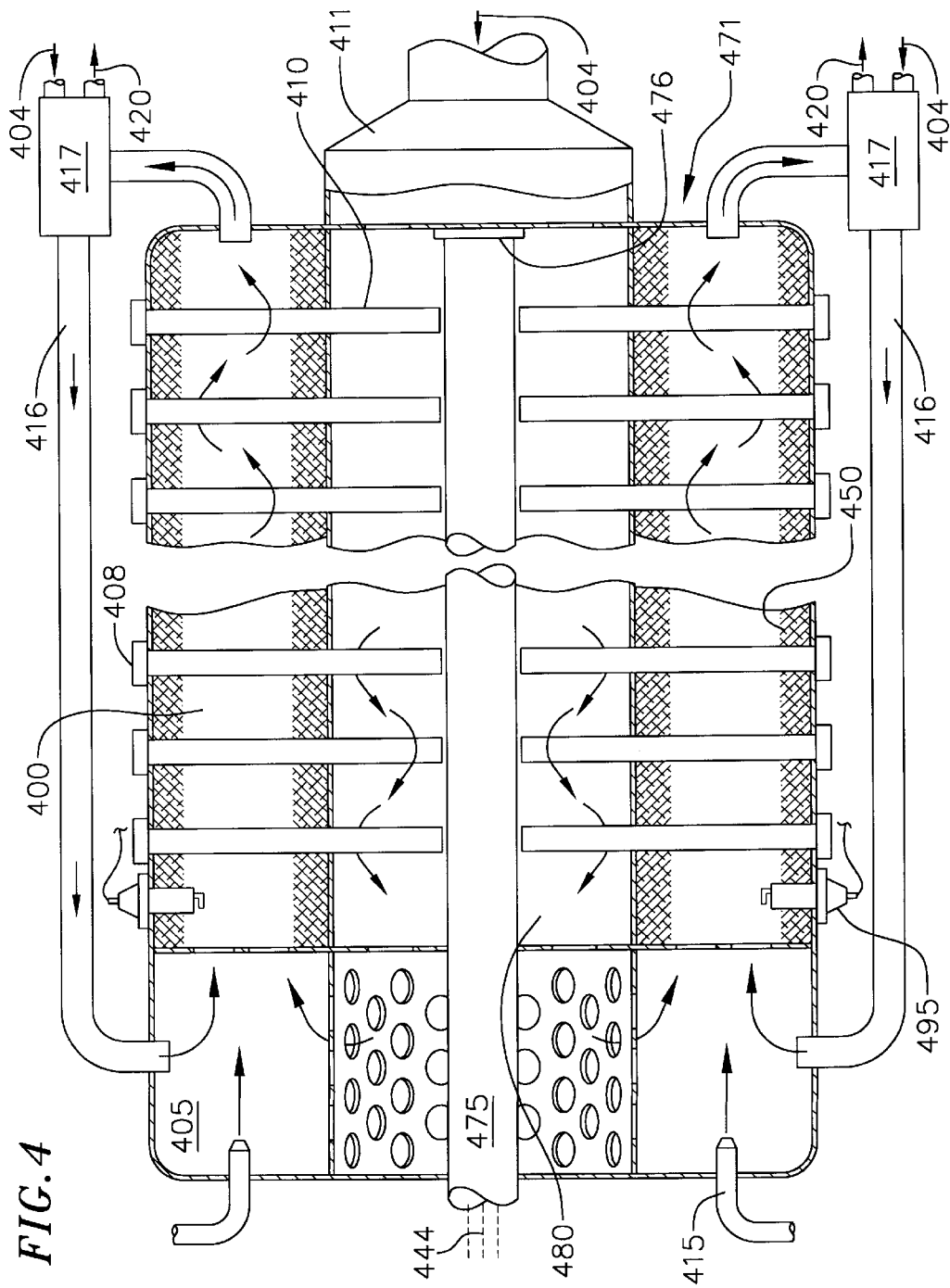
FIG. 4 is a cross-sectional side view of a light pipe pumped laser with recuperator.

FIG. 4, Example 4 illustrates an embodiment comprising a recuperator system 417 that has been added to increase efficiency, and a PV cell system 408 added for generating thermal PV electric power. Light pipes 410 are placed within the gas air combustion system 400. The light pipes 410 may be arranged in a variety of patterns to create a near uniform temperature distribution within the emissive matrix. A burner head system 405 supplies combustion energy to an emitter systems comprising superemissive felt 450, which is contained within a chamber 471 of the laser 475. Photons generated within the emitter system 450 and 410 optionally pass through a band pass filter 248 (as shown in FIG. 2) to a laser target 475 and PV cells 408. Note the PV cells may be cooled by a suitable cooling means (not shown). The laser action is produced more efficiently than conventional flash pumped or laser diode pumped lasers which require an electric power supply, power conditioning as well as an optical pump.

One end of the laser 415 has a mirror 476 attached to it, which is high reflecting at the desired laser wavelength. The other end of the laser is an emitting end 444 having an output coupling mirror. Air 404 is provided to the recuperator 417 by means of a blower (not shown). The air is then heated and passes though a tube 416 to a burner head premixed chamber 405 where fuel 415 is added and mixed with hot air from the combustion system 400. The premixed fuel and air is then distributed to the combustion chamber 400 by means of a perforated layer 490. The fuel and air mixture is ignited for combustion by an ignitor 495 spent combustion air 2/20 exits the recuperator and is used to preheat the incoming air 404. In addition, air 404 is provided to cool the laser rod by means of an air inlet system 411 to the central section of the fossil fuel powered laser 475. The portion of the light pipes 410 located in the inner chamber 480 is thus cooled by air or another means (not shown). The laser rod 475 may also be cooled by a liquid or other means (not shown). The annular space of the combustion chamber 400 is lined with superemissive felt 450 to reduce out-of-band radiation.

Figure 5:
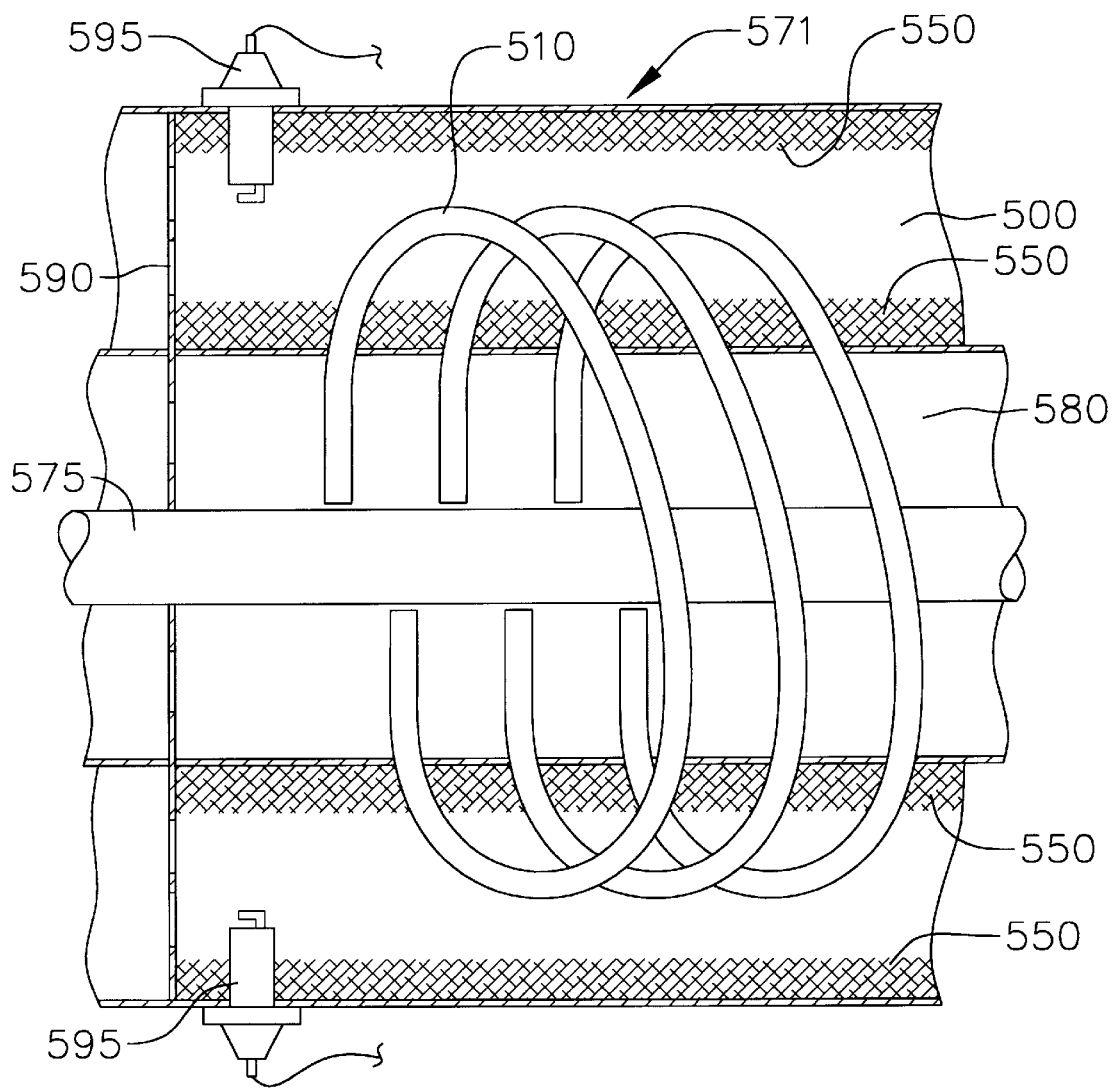
FIG. 5 is a cross-sectional side view of a light pipe pumped laser with double end pumps.

FIG. 5 illustrates a system of this invention similar to that illustrated in FIG. 4 except that where light pipes 510 use a waveguide with both ends of the light pipes 510 directed onto a laser rod 575. The light pipes 510 may be configured into an emissive matrix combustion geometry, and may also be heated with other heat sources. Optically thin spacing provides for excellent heat transfer of hot gas(es) such as helium from an HTGR or combustion gases. In the case of combustion gases, an ignitor 595 is provided. The heat source gases enter a heat transfer chamber 500 by an entry means 590 such as perforations or the like. The heat generates photons within the light pipes 510 which are directed to the laser mechanism 575 in the center of the cylinder. The system comprises superemissive felt 550 in the combustion chamber 500 that is disposed along the annular chamber shell 571, and a combustion ignitor 595 also disposed therein.

Figure 6:
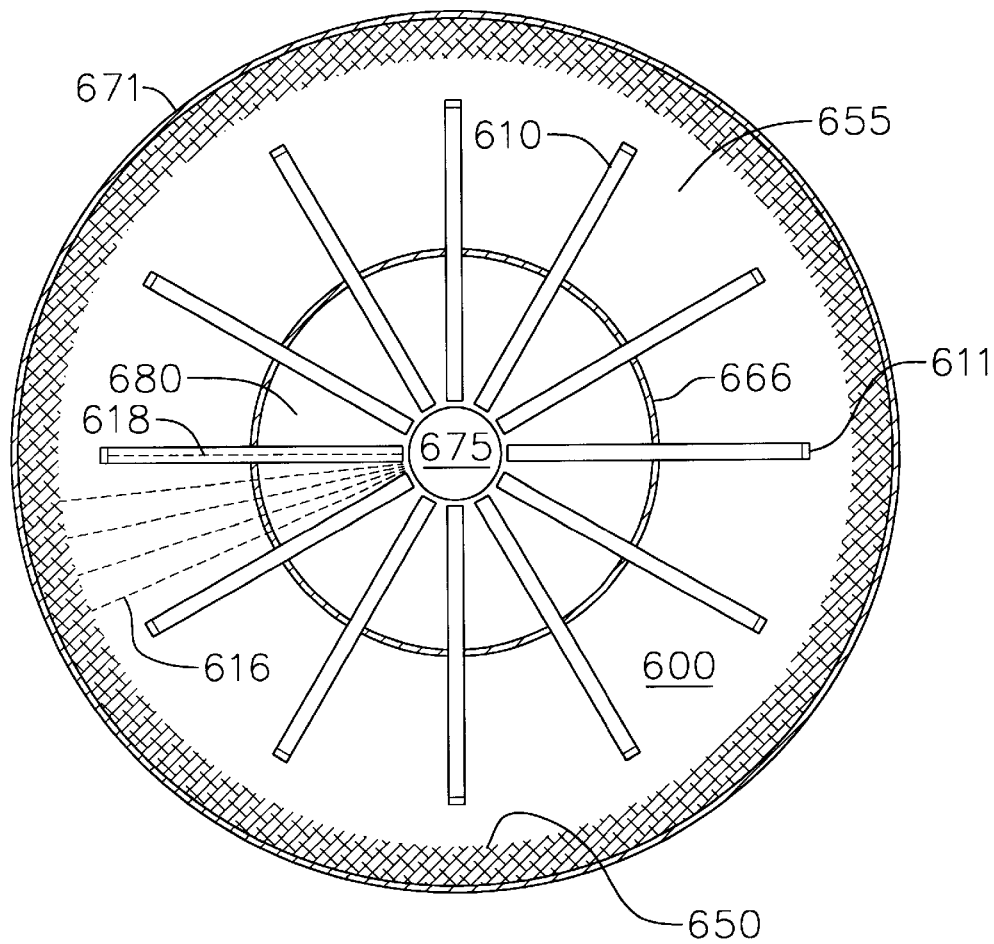
FIG. 6 is a radial cross-sectional end view of a light pipe pumped laser with an entire light pipe inside a combustion chamber.

FIG. 6 shows the application of a using a jet engine exhaust stream 655 to produce photons within a number of light pipes 610. The waveguide in this case delivers selected photons to the laser rod 675 or cavity. The heat from the exhaust is transferred to the light pipes 610 as illustrated in FIG. 6. The photons generated within the light pipes are focused through an end of each light pipe to an optical wave carrier to the laser 675.

There are a number of design factors that can effect any combustion driven superemissive light pipe photon generator such as surface area, optical transmission loss within the fiber, reflection efficiency of the optically selective reflector design which can be placed on the end of the light pipe, to keep the heat in and let the selected photons out. It is important that outer cladding over the light pipe have a low emissivity compared to the emissive layer. It is also important that the light pipe host material(s) yield a low level of off-band radiation. This off-band radiation can be filtered cost effectively by means of band-pass type filter systems attached to the end of the light pipe, waveguide, optical fiber(s) or by the light pipe fiber system itself.

In addition, it is feasible to use graded layers for applying thoria to sapphire or YAG based optical fiber systems. The ability to produce a thermal shock resistant product and one that is stable to thermal expansion is critical to long term operation. The thinner the diameter of the material used to make the light pipe, the more photon per BTU is likely to be produced, because better heat transfer is likely to be between the combustion gases and the emitter system. Of course the use of recuperation is still as important as in any thermal photovoltaic (TPV) system in order to capture the heat in the exhausted gases and then transfer that energy to the incoming oxidizer and fuel.

Example 5 is depicted in FIG. 6. The thermal laser shown in FIG. 6 is similar to that illustrated in FIGS. 1 and 3, except that the inner wall of the chamber 600 is a transparent material 666 and not an insulating felt 650. Photons generated by the superemissive felt 650 and the outer portion of the light pipes as well as the inner portion of the light pipes, which escapes the waveguide, will be transmitted through the transparent material 666 to the laser 675 or will be absorbed by the felt and remitter. Some of the energy, a few percent, will be emitted as stand by losses through the insulation. In this case the light pipes 610 do not extend completely across the chamber 600, but instead end just inside the superemissive felt 650 disposed along the annular shell 671. Additional thermal losses will occur in a combustion system as the products of combustion carry away heat. In a nuclear system the losses will be less from escaping gases as in an HTGR the gas is recycled. Also, in certain chemical system no gases escape, thereby reducing loses. An efficient recuperator (not shown) will greatly reduce exhaust gas losses in any combustion system.

Figure 7:
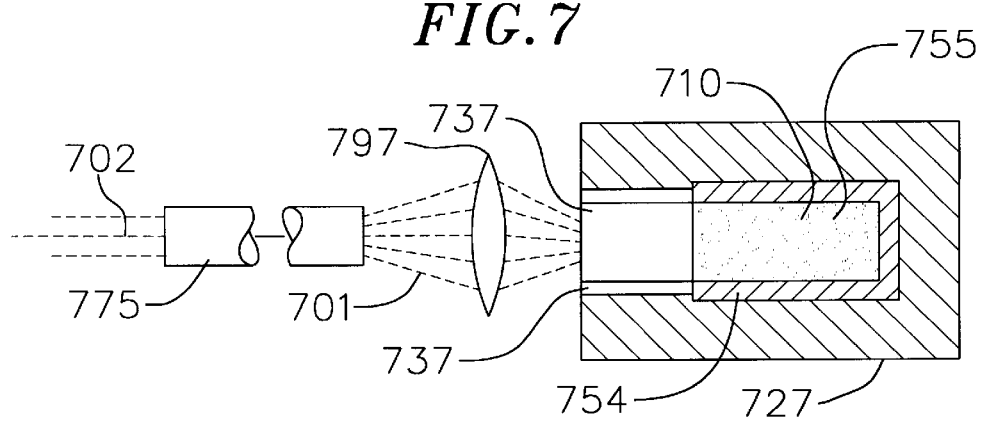
FIG. 7 is schematic cross-sectional side view of a light pipe pumped laser with nuclear heat source and lens.

FIG. 7 illustrates the interaction of isotope or nuclear heat sources 755 on a light pipe 710. Such a heat source may be used to heat the light pipes internally 755 or externally using nuclear or isotope material contained within or nearby the light pipe 710. The heat produced will raise the temperature of the light pipe 710 to emit photons predominately in certain selected regions of the spectra. One example of such a self-heated light pipe 710 for laser applications is shown in FIG. 7. The photons produced by the light pipe 710 may optionally pass through a secondary waveguide 737 to a lens 797, which gathers and then focuses the photons 701 onto the laser 775.

Examples of radioactive isotopes include strontium 90 and plutonium 238 which may be incorporated in a transparent glass or ceramic material 710. FIG. 7 illustrates the use of an optically transparent isotope 755 doped with superemitter and coated with optical cladding 754 capable of reflecting the photons generated 701 such that the photons can be directed to a target lens 797, and in turn the lens collects the photons 701 and directs them to the laser 775. The photon flux 701 may be enhanced and the efficiency improved by the use of a band pass filter (not shown). Alternately, the radioisotope or nuclear heat source may be outside the light pipe. The heat source may be 717 in the form of a solid, liquid or gas. The heat source may be insulated by a layer of insulation 727. The light pipe cool section is optional and may be cooled by suitable cooling means 737. The laser emits laser photons 702 as shown.

Figure 8:
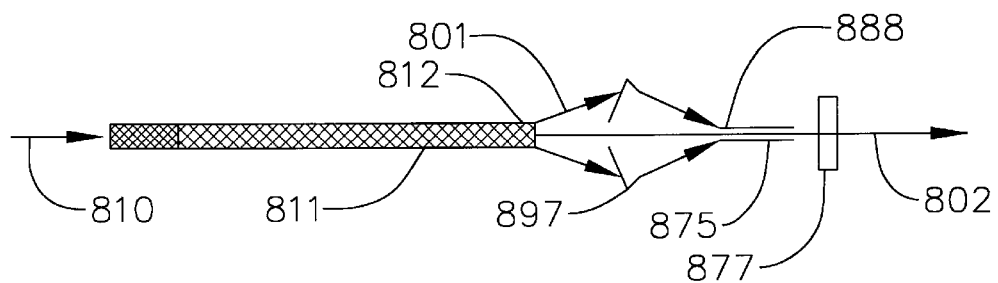
FIG. 8 is a schematic side view of an end pumped laser by light pipe using a lens coupling.

In addition to light pipe waveguides pumping a laser transverse (perpendicular) to the laser rod axis and laser beam direction, as shown in FIG. 1, the light pipe waveguide can also be arranged to pump a laser longitudinal to the laser rod axis and laser beam direction. This longitudinal or "end pumped" arrangement is illustrated in FIG. 8. The superemissive source 810 is at the proximal end of a cylindrical-shaped rod waveguide 811. The waveguide 811 has an antireflection coating 812 for a pump light 801 generated by the source 810 which maximizes the pump light 801 transmission to a laser rod 875. Lens 897 relays the pump light 801 from the waveguide 811 to the laser rod 875. The end of the laser rod 875 where the pump light 801 enters is coated with a high reflecting mirror 888. This mirror 888 is dichroic in that it allows the pump light 801 to enter with maximum transmission while it reflects the laser light 802 at maximum reflection (minimum transmission) An output coupling mirror component 877 is a partial reflector for the laser light 802 which is aligned to the high reflecting mirror 888 forming a laser resonator to produce the laser light 802.

Figure 9:
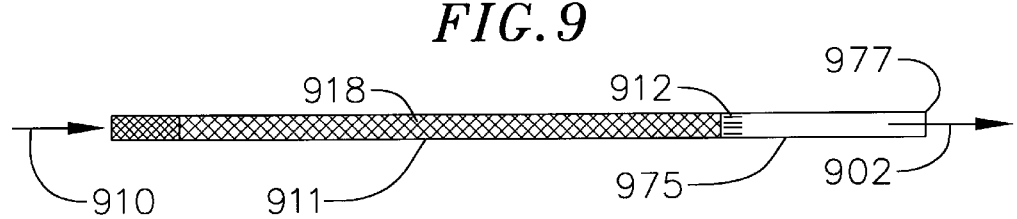
FIG. 9 is a schematic side view of a laser incorporated into a light pipe waveguide system.

FIG. 9 shows an improvement in coupling the pump light 918 to a laser. Instead of having a separate laser rod, the laser active material 975 is formed by doping the waveguide itself with laser-active ions, such as Nd, Er, Ho, Tm and/or Yb rare earth ions, at the distal end of the waveguide 911. The superemissive source 910 is at the distal end of the waveguide, and the waveguide 911 between the source 910 and the laser active material 975 is pure or undoped material, glass or crystalline. The laser resonator is formed by an embedded reflector 912, either a grating or mirror, and an output coupling mirror, either as a coating 977 or as a separate optical component (not shown). The pumped laser-active material 975 inside the laser resonator (reflectors 912 and 977) produces the laser light 902.

Figure 10:
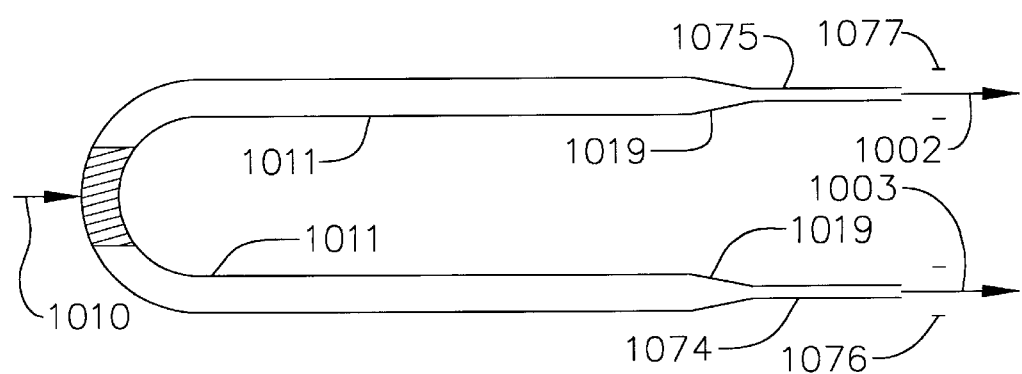
FIG. 10 is a schematic side view of a light pipe waveguide pumping two lasers.

A light pipe waveguide can pump two lasers simultaneously as illustrated in FIG. 10. The superemissive source 1010 is placed in the middle of the waveguide 1011 with the opposite ends of the waveguide directed toward the lasers 1074 and 1075. The pump light emitted by the superemissive source 1010 is relayed to the laser rods 1074 and 1075 by either tapered optical fiber couplers 1019 or lenses, as shown in FIG. 8. Dichroic high reflecting mirrors are coated onto the laser rods 1074 and 1075 at the rod ends where the pump light enters. The output coupling mirrors 1076 and 1077 are shown as separate optical components, but can also be coatings (not shown). The two lasers can be the same or different lasers, producing different laser wavelengths 1002 and 1003 to perform different optical applications by using the same superemissive source 1010. For example, the source 1010 can be ytterbium aluminum garnet (YbAG) with peak emission at 980 nm. The light produced by this YbAG source can efficiently pump neodymium YAG (1.06 and 1.32 $\mu$m), erbium YAG (1.62 and 2.94 $\mu$m), and ytterbium YAG (1.04 $\mu$m) lasers.

Figure 11:
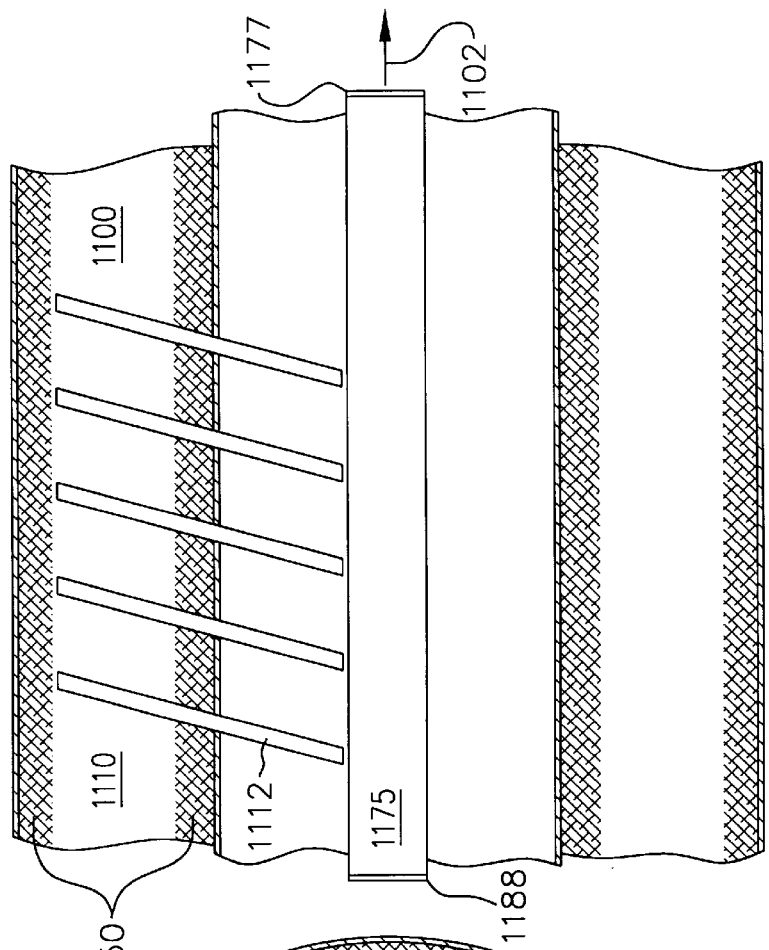
FIG. 11 is a cross-sectional side view of an advanced emissive matrix combustion system with light pipe as emissive elements.

FIG. 11 depicts a light pipe laser pumping system based on an emissive matrix combustion device. Emissive matrix combustion enables to provide 3-D combustion within an optically thin emitter which benefits as high power density and high radiant output combustion technology. A combustible mixture is delivered to the annular combustion chamber where an emissive matrix 1110 is installed. The emissive matrix in this case is made of light pipes 1112 and the superemissive sections of each light pipe 1112 are located in an active flame zone, to generate narrow band photons which are delivered to a laser rod 1175 through the light pipes 1112. Internal walls of the emissive chamber are covered with a superemissive refractory 1150 that also emit photons the same wavelength as the light pipes. Such a combustion system is capable of providing high power density combustion (up to 30 W/cm$^2$) along with an exceptional radiant output (up to 50%). In order to increase an overall system efficiency, this system can be equipped with the exhaust to air/fuel heat exchanger (not shown). Mirrors 1177 and 1188 are attached at opposite ends of the laser rod 1175 to produce a narrow band photon output 1102.

Figure 12:
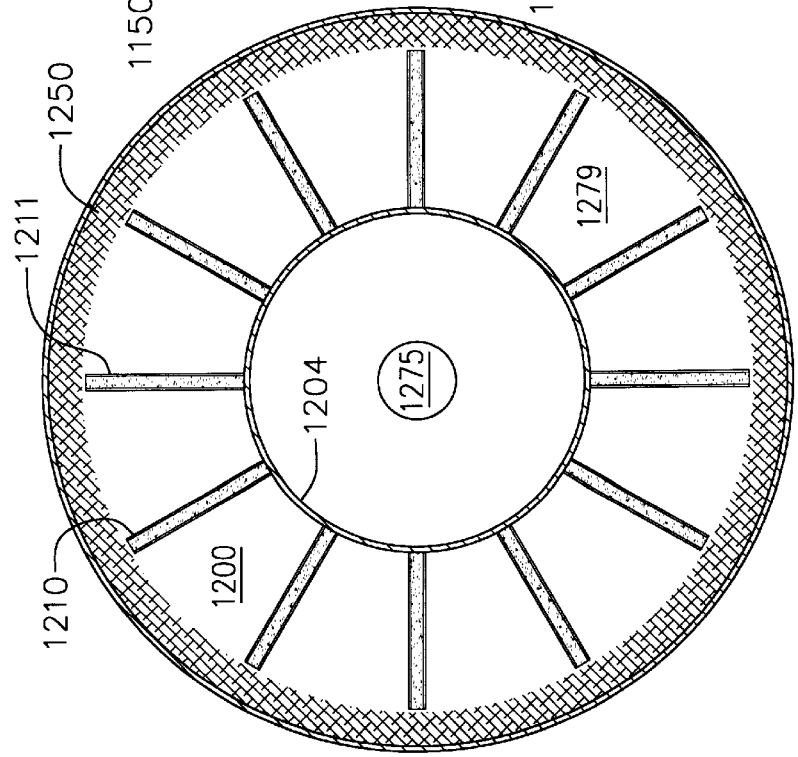
FIG. 12 is a radial cross-sectional end view of an advanced emissive matrix/light pipe system with a transparent central tube.

FIG. 12 represents another emissive matrix combustion system 1200 for a light pipe laser pumping device. Laser rod 1275 is located at the center of the unit, inside of a perforated tube. The emissive matrix combustor 1200 has an annular shape with multiple light pipes 1210 disposed radially within a transparent tube. The light pipes 210 are coated 1211, doped or impregnated, with a desired superemissive materials. Each light pipe is attached between the transparent tube and the outer wall. The combustor outer wall covered with the superemissive refractory material 1250 in order to increase narrow band photon emission. Laser rod 1275 is supplied with the photons by the multiple light pipes and superemissive refractory. Such a system is expected to be more efficient due to an additional narrow band photon utilization from the superemissive refractory.

Figure 13:
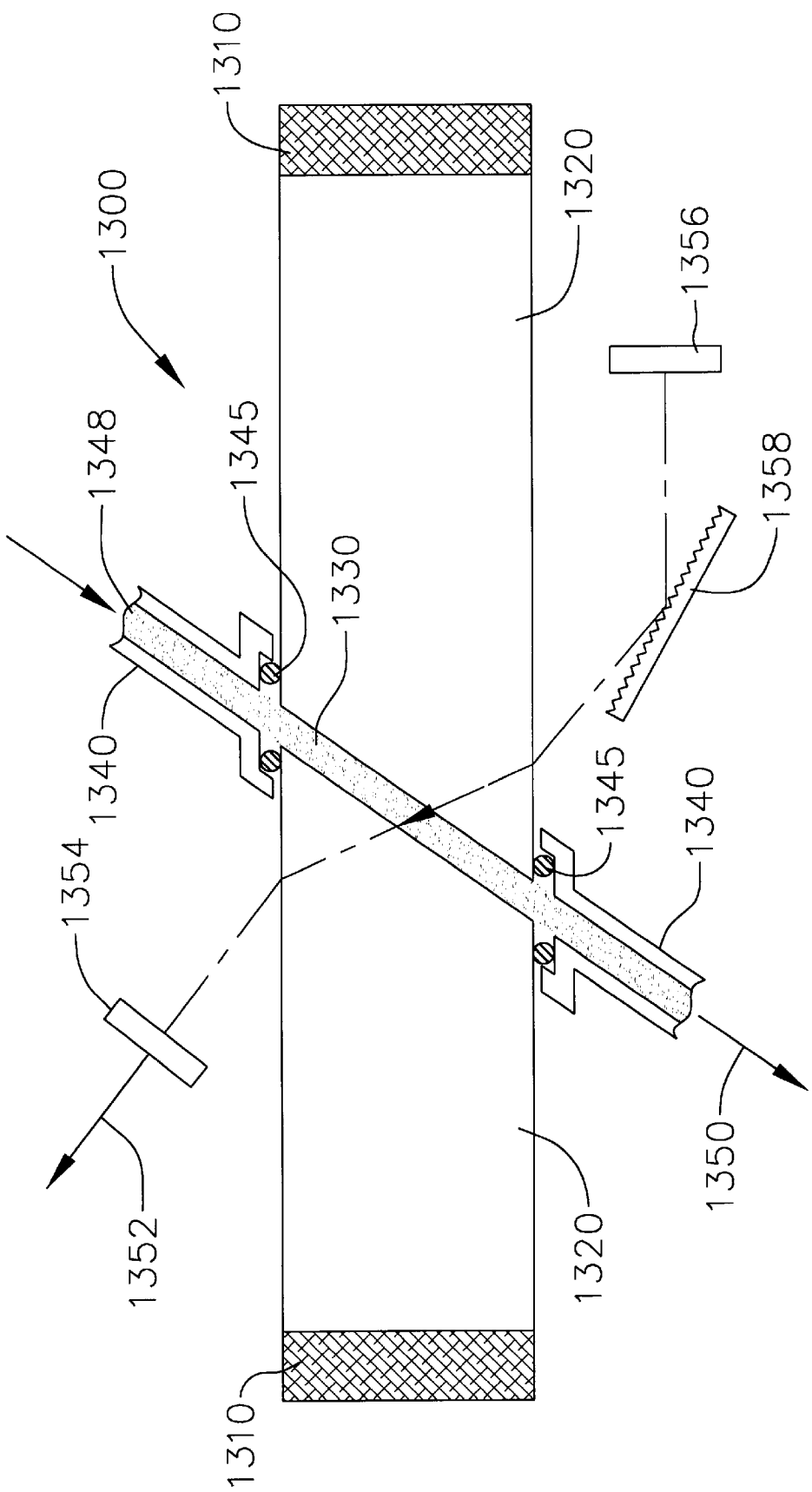
FIG. 13 is a schematic cross-sectional side view of a light pipe pumping a flowing liquid dye laser using ribbon waveguide geometry.

An organic-dye liquid laser 1300 can be pumped by a superemissive source 1310 using a ribbon waveguide 1320 geometry as shown in FIG. 13. The distal ends of two ribbon waveguides 1320 form a channel for flowing dye liquid 1330. The dye liquid is contained by tubes 1340 sealed to the waveguides by O-rings 1345, with input and output orifices 1348 and 1350, respectively. The channel is at an angle (shown, for example as 45° in FIG. 13) to the waveguide direction in order to be able to couple the laser light out of the dye without being blocked by the superemissive source. With undoped YAG as the ribbon waveguide material, the laser light has 1352 an angle of incidence on the dye channel of approximately 22° for the choice of 45° for the channel angle. These angles allow easy coupling of the dye laser light out of the dye laser action region. Laser mirrors 1354 and 1356 (a high reflecting mirror and an output coupling mirror) are located outside the waveguides to form the laser resonator. The appropriate sides of the waveguides have polished windows to bring about the transmission of the laser light to the mirrors. A tuning element 1358, either a grating (as shown) or prisms (not shown) or other devices, is placed between the mirrors to vary the laser wavelength as desired. The dye liquid 1330 flows through the laser region to avoid any heating of the liquid by the superemissive source pump light. Optical properties of liquids are very sensitive to the slightest change in temperature, and the liquid flow avoids this sensitivity to temperature rise.

The optical configuration of FIG. 13 can also be used to pump thin microlaser crystals instead of flowing dye liquids. The channel is replaced by a thin laser crystal such as neodymium in yttrium orthovanadate (YVO$_4$) or in yttrium aluminum garnet (YAG). The crystal thickness can vary from 0.5 to 2 millimeters to produce single longitudinal mode operation which is wanted for microlaser applications.

Figure 14:
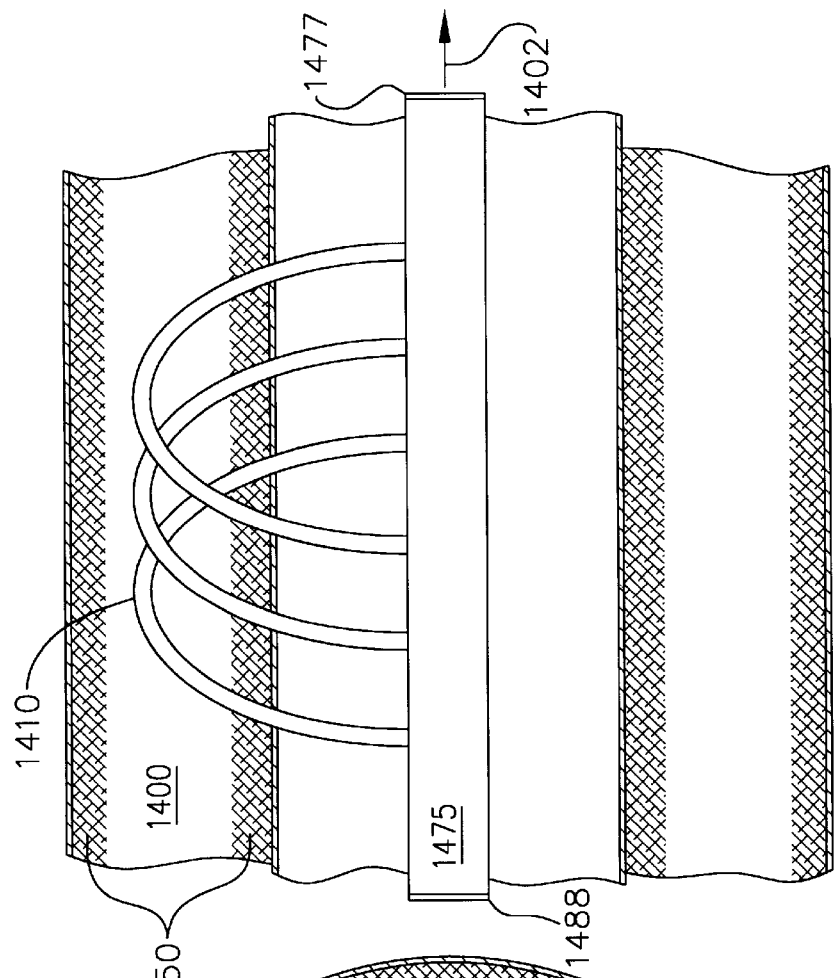
FIG. 14 is a cross-sectional side view of an advanced emissive matrix/light pipe system with both ends of light pipe directed to laser (same as FIG. 5)

FIG. 14 represents another light pipe laser pumping system based on an emissive matrix combustion heat source 1400. This design utilizes the narrow band photon emission from both ends of superemissive light pipes 1410. The emissive matrix combustor 1400 is assembled as a set of banded light pipes 1410 which have a radius that prevents photon losses. The superemissive portion of the light pipes 1410 are located in an active flame zone of the combustor. Internal walls of the combustor are covered with a superemissive materials 1450, to create an additional source of the narrow band photons. The photons which are generated inside of the light pipes 1410 are delivered to a laser rod 1475 through the waveguide portion of the light pipes. Mirrors 1477 and 1488 are attached to ends of the laser rod 1475 to enable emission of a narrow band photon output 1402 therefrom. It is expected that such a system is able to deliver two times more narrow band photons to the laser rod 1475 then the devices described in FIGS. 11 and 12.

Figure 15:
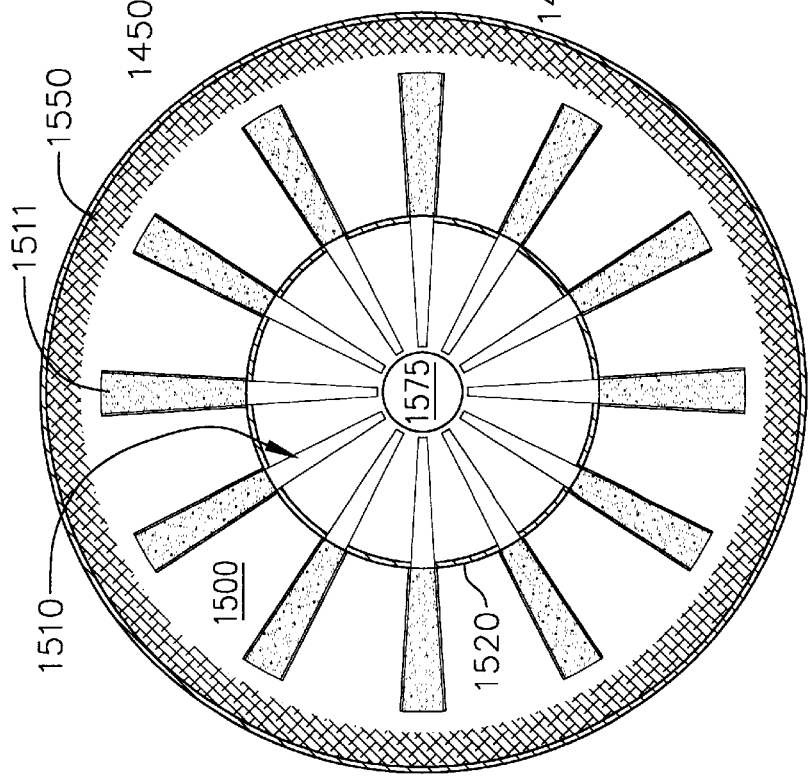
FIG. 15 is a radial cross-sectional end view of an advanced emissive matrix/light pipe system with tapered light pipes.

FIG. 15 presents an another approach of using an emissive matrix combustor 1500 to power a laser having a tapered light pipe structure. The combustor 1500 comprises tapered light pipes 1510 that extend radially through a combustor perforated tube 1520. The internal wall of the combustor is covered with the superemissive refractory 1550 in order to enhance a narrow band photon flux. The superemissive sections of the light pipes can be provided by a superemissive coating 1511, which generates photons of desirable wavelength. The tapered shape of the light pipes enable the photon flux which is generated in superemissive section of the light pipe to be concentrated and delivered to a laser rod 1575.

Figure 16:
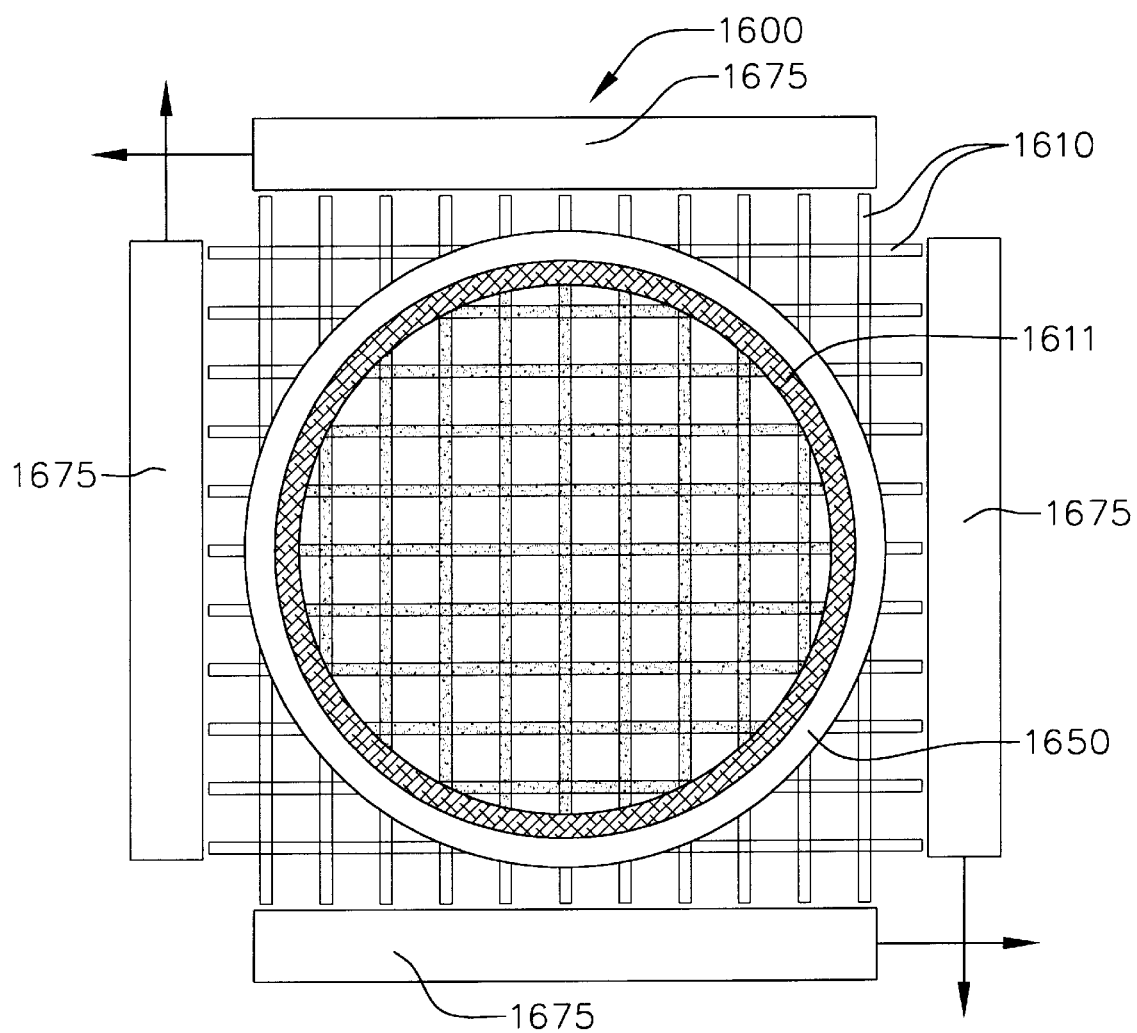
FIG. 16 is a cross-sectional view of a log cabin advanced emissive matrix design pumping four lasers.

FIG. 16 exhibits a light pipe-emissive matrix combustion device 1600 for pumping four lasers simultaneously. Light pipes 1610 are installed inside of the cylindrical combustion chamber in the form of a matrix that is referred to as a "log cabin". An internal wall of the combustor is covered with a superemissive refractory 1611. The emissive matrix combustion provides an effective heat transfer from the hot gases therein to the set of light pipes 1610. Photons are generated inside of the light pipes and are delivered to the laser rods 1675, which are installed outside the combustor. Such a design is expected to have an advantage as simple laser rod cooling system can be employed. Another benefit is the capability to pump several lasers by using one combustion device.

Figure 17:
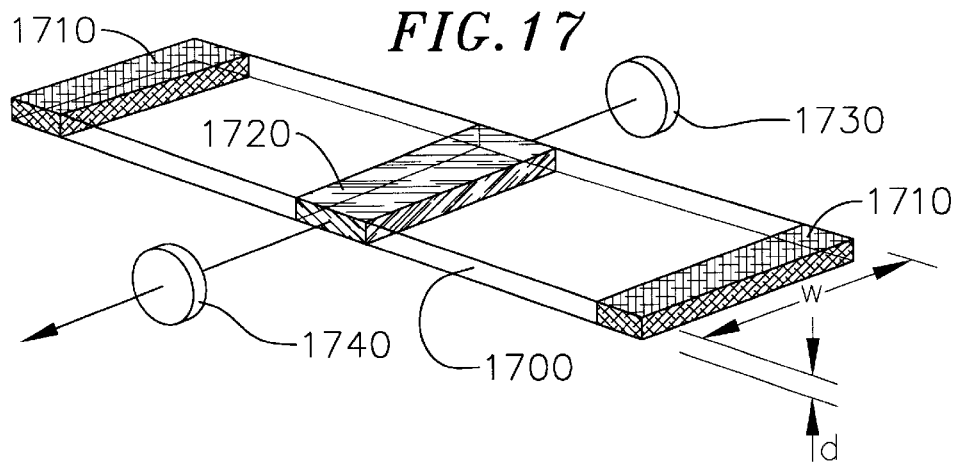
FIG. 17 is a schematic view of a ribbon waveguide geometry for a light pipe pumping laser slab that is transverse to a laser beam.

The waveguide has been described above as cylindrically shaped rod or pipe. However, it is to be understood that the waveguide can be of any shape appropriate for the application. FIG. 17 shows a ribbon-shaped waveguide 1700 which is particularly suitable for coupling pump light from a superemissive source 1710 into a laser-active material 1720. The beam divergence of the pump light is large (near 45 arc degrees) for a rod-shaped waveguide, making the coupling of the pump light into a laser material a complex optical problem. However, when the waveguide is ribbon shaped, having a thin rectangular cross-section with the width w and the thickness d in a ratio near to 4:1, the large divergence is mitigated by using a large width w of the ribbon waveguide to couple into the laser material.

The pump laser from the superemissive source is perpendicular (transverse) to the laser light direction as shown in FIG. 17. The laser slab 1720 is abutted to or attached to the ribbon waveguide 1700, either by diffusion bonding or optical glue. The laser slab is inside the laser resonator formed by a high reflecting mirror 17320 and an output coupling mirror 1740. Since the pumping is transverse, no dichroic mirrors are required. The ribbon geometry of the light pipe waveguide also solves the problem of maximizing the volume of the superemissive source while decreasing the self-absorption of the emitted pump light by the source. Greater volume of the superemissive source means more pump intensity.

The laser material can be in shape of a rod when using a ribbon waveguide. While two light pipe ribbon waveguides 1700 were shown in FIG. 17 to pump a laser slab 1720, many ribbon waveguides can be used to pump a laser rod (not shown). The waveguide interface with the laser rod can be curved to match the laser rod circumference.

Figure 18:
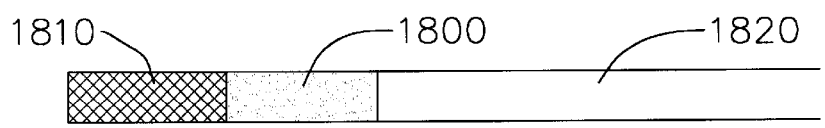
FIG. 18 is a cross-sectional side view of a light pipe incorporating a low thermally conductive crystal section as an insulator.

When the waveguide is made of a moderately thermally conductive material such as the crystal yttrium aluminum garnet (YAG), the heat from the superemissive source can transfer down the waveguide to the laser material. While the subsequent temperature rise at the waveguide's end is not too excessive, it still causes heating of the laser material and reduction of temperature of the superemissive source, and hence a reduction in the source's efficiency. These problems can be avoided (as shown in FIG. 18) when a section of a low conductivity material 1800, glass or crystalline, is placed between the source and the pure undoped waveguide parts of the light pipe structure 1810 and 1820, respectively. In such a design, the heat is retained in the superemissive source 1810 where it is most effective in producing the pump light for the laser.

Figure 19:
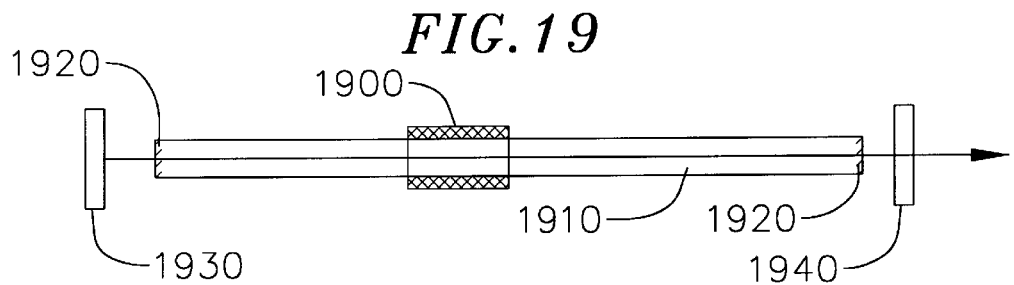
FIG. 19 is a schematic side view of a superemitter coated onto a laser rod or slab.

FIG. 19 shows a superemissive source 1900 coated directly onto a laser rod or slab 1910. The source 1900 is placed near the middle of the laser material in order to avoid thermal damage to the reflection and/or antireflection coatings 1920 by the heat transferred from the superemissive source. FIG. 19 shows a laser resonator geometry where the rod or slab has antireflection coatings 1920 for the laser light at the ends, and two mirror components 1930 and 1940 forming the laser resonator. The mirrors are a high reflecting mirror 1930 and an output coupling mirror 1940 designed for the laser wavelength only. Dichroic mirrors are not required since the pump light is internally generated by the superemissive source on the laser material. Any thermally induced refractive-index distortion in the region of the superemissive source is compensated for by adjusting the curvature of the mirrors.

Figure 20:
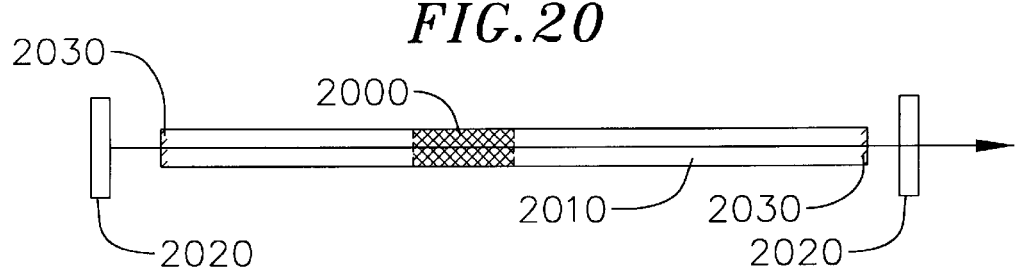
FIG. 20 is a schematic side view of a section of laser rod or slab used as a superemitter.

In some laser materials, such as for example erbium YAG and ytterbium YAG, no superemissive coating is needed to produce the result of FIG. 19. Instead, a section 2000 of a laser rod 2010 or slab is heated (as shown in FIG. 20) and becomes a superemissive source on its own. This source then pumps the unheated remainder of the laser material, resulting in laser action. The optical arrangement for laser action in this "self-superemissive pumping" scheme is nearly identical to FIG. 19 as illustrated in FIG. 20 using the mirrors 2020 and antireflection coatings 2030 as shown. Again, the thermal lensing producing the thermally induced refractive-index distortion in the heated region of the superemissive source is compensated by mirror curvature.

Figure 21:
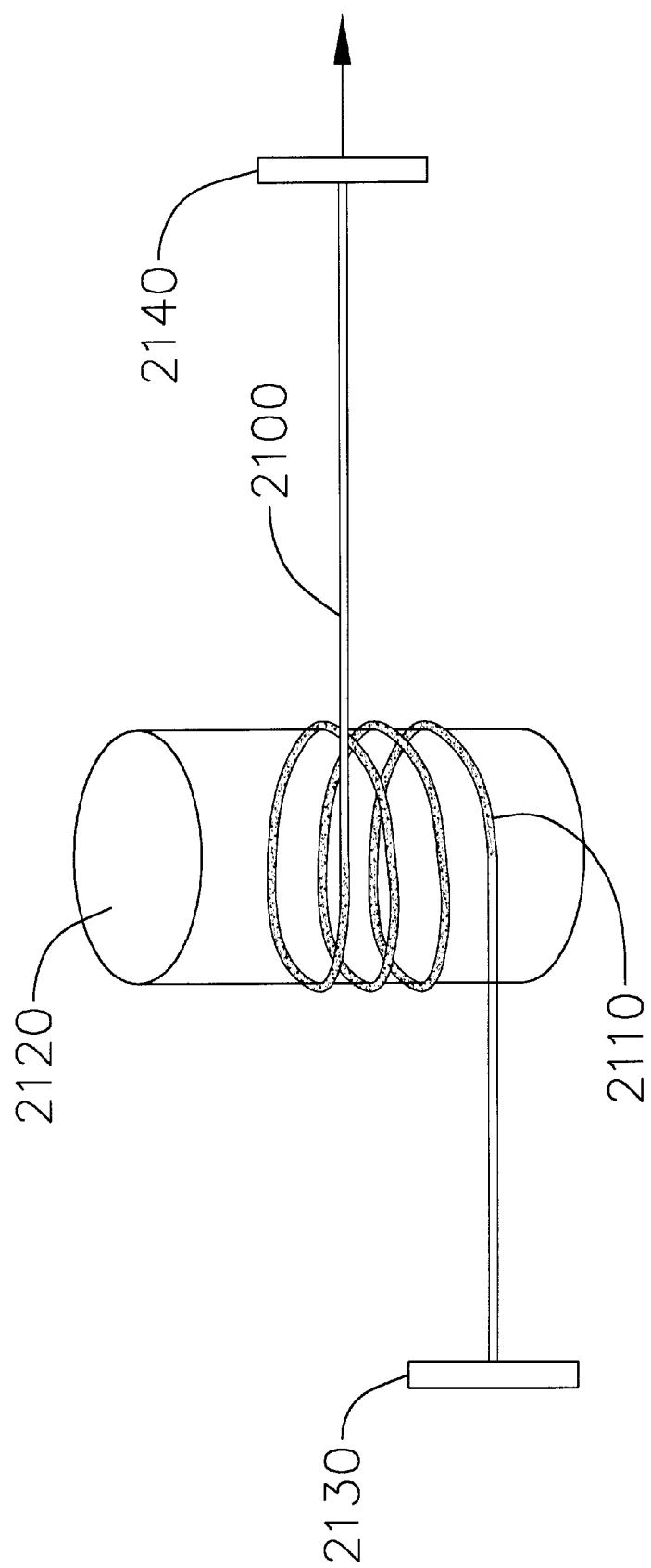
FIG. 21 is a schematic view of a superemitter coated onto laser fiber.

All of the above techniques can be used with laser material in the shape of a fiber, such as neodymium or erbium doped silica fiber, which is currently common in communication and optical sensor applications using conventional diode pump sources. A fiber laser can be constructed with the techniques described for FIGS. 19 and 20. FIG. 21 shows a laser fiber 2100 coated with a superemissive coating 2110 and coiled within a heating chamber 2120. The laser action is produced by placing a high reflecting mirror 2130 and an output coupling mirror 2140 at the opposite extremities of the laser fiber. Curvature of the mirrors can be adjusted to overcome any thermal lensing produced in the superemissive source region.

Figure 22:
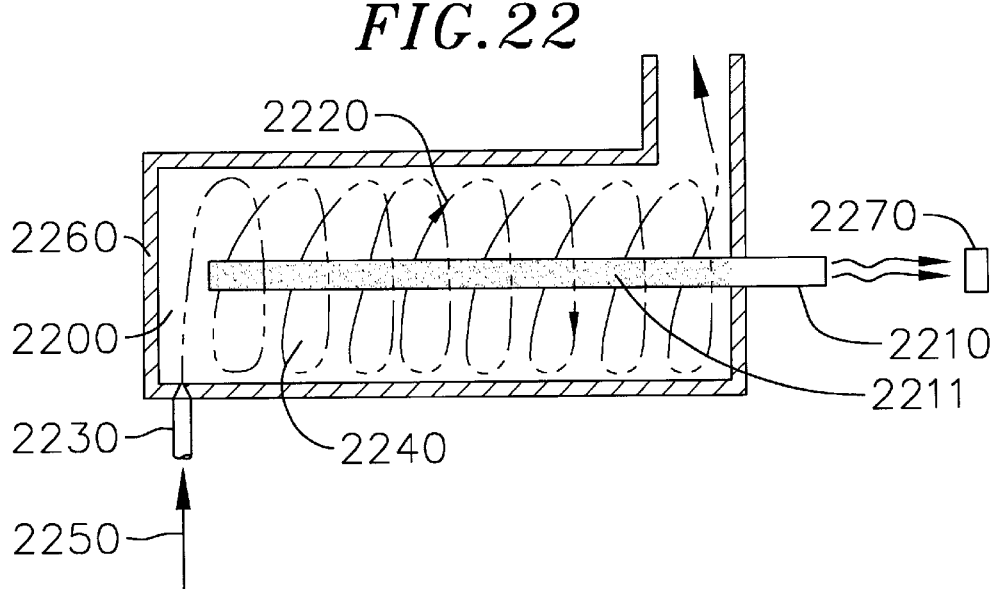
FIG. 22 is a schematic cross-sectional side view of a vortex combustion system with a single end light pipe.

FIG. 22 illustrates a light pipe laser pumping system based on a high energy density vortex combustor 2200 comprising a light pipe 2210 which is located at the center of the device, and a cylindrical combustion chamber 2220 with at least one nozzle 2230 for combustible mixture 2250 injection. The nozzle is installed in the combustor at a specific angle that creates a vortex of the combustion products 2240 around the light pipe. Because of the vortex combustion, the residence time of the hot combustion products is larger then the emissive matrix approach, so more energy that is released during combustion can be transferred to the light pipe, resulting in narrow band photon output enlarging. Internal walls of the combustor are covered with a refractory or superemissive material 2260 in order to increase the narrow band photon output. Thermal energy from the combustion products is transferred to a superemissive section 2211 of the light pipe 2210 and a narrow band photon emission generated by the light pipe is delivered to a target 2270 which is a laser rod.

Figure 23:
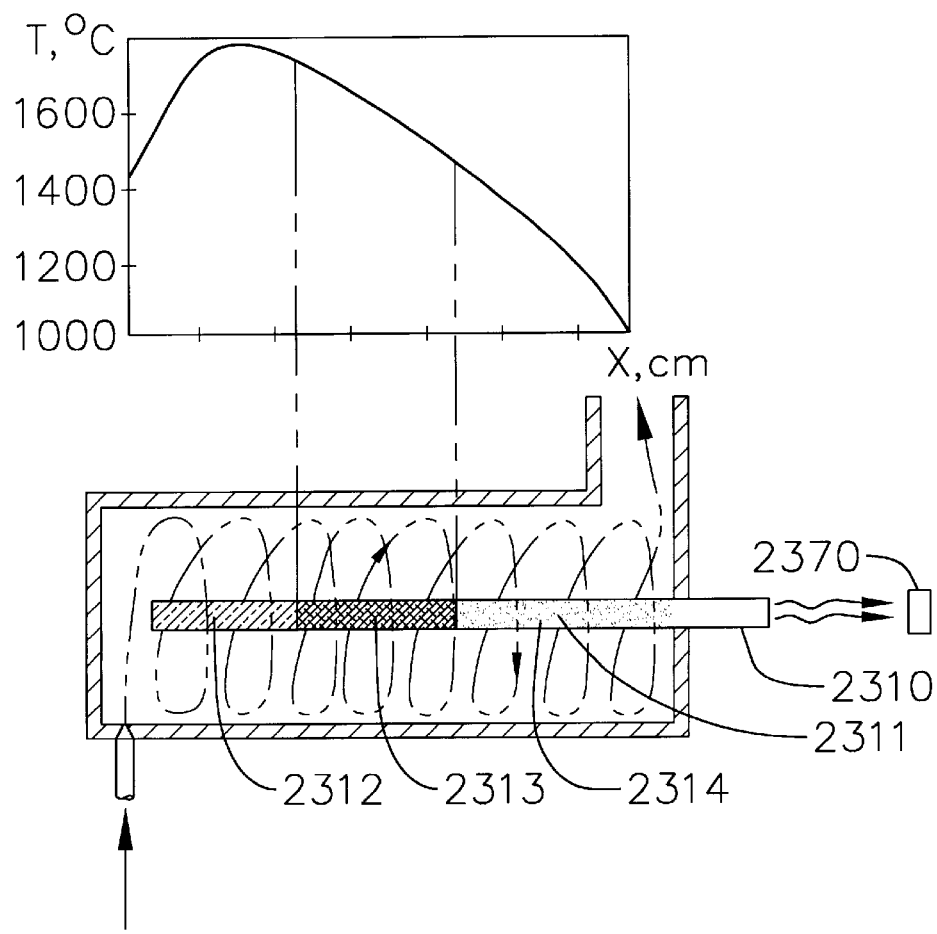
FIG. 23 is a schematic cross-sectional side view of a vortex combustion light pipe system with multiple superemissive materials incorporated into a light pipe.

FIG. 23 also illustrates a vortex based light pipe system similar to that described in FIG. 21. The difference between the two designs is that the superemissive section 2311 of the light pipe 2310 is fabricated from several superemitter sections 2312, 2313 and 2314. It is known that each superemitter section has a maximum efficiency at some specific temperature, for example a ytterbia emitter produces highest emission output at about 3000 K, erbia has a maximum efficiency at 2000 K, holmia and neodimia at 1450–1500 K.

By integrating several superemissive materials into the light pipe according to a combustor temperature profile, more energy can be delivered to the target 2370 such as a laser or PV cell or other targets. It is possible to install the light pipe into the heat source in a way that is presented in FIGS. 24 and 25, so that both ends can deliver photon emission to the target. In this case the reflective material can be applied at one end of the light pipe to reflect the portion of photons which are not useful for laser to the other end 2410, where a PV cell can be installed. Having a photon flux with several different wavelengths can provide additional electric power generation by using PV materials with the broader absorption spectrum or tandem type cells.

Figure 24:
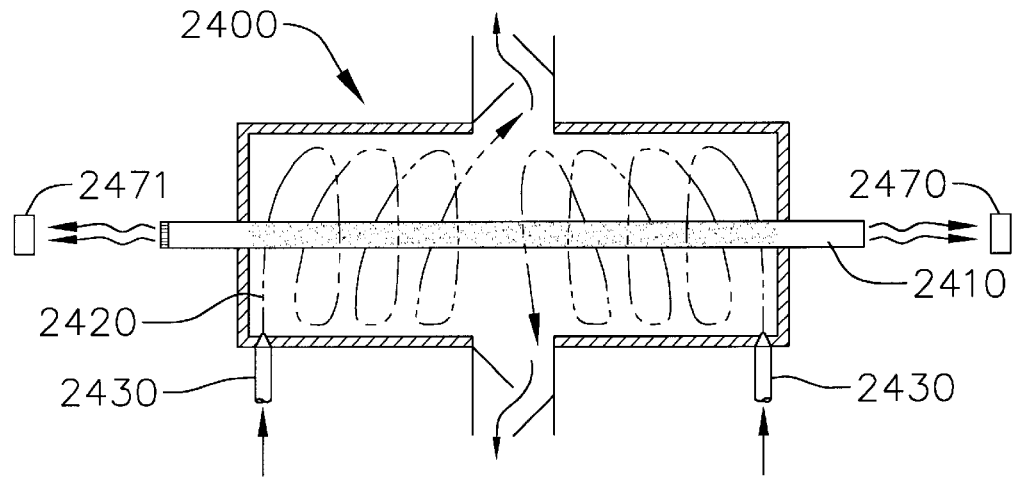
FIG. 24 is a schematic cross-sectional side view of a double end light pipe/vortex system.

FIG. 24 presents another vortex light pipe system 2400 which can utilize the photon emissions from both ends of the light pipe 2410. At least two nozzles 2430 are installed into the combustor 2420 in order to provide uniform heat release into the combustion chamber. Such a system is able to power two lasers 2470 and 2471, or pump one laser and generate an electric power at the other end by using a PV converter.

Figure 25:
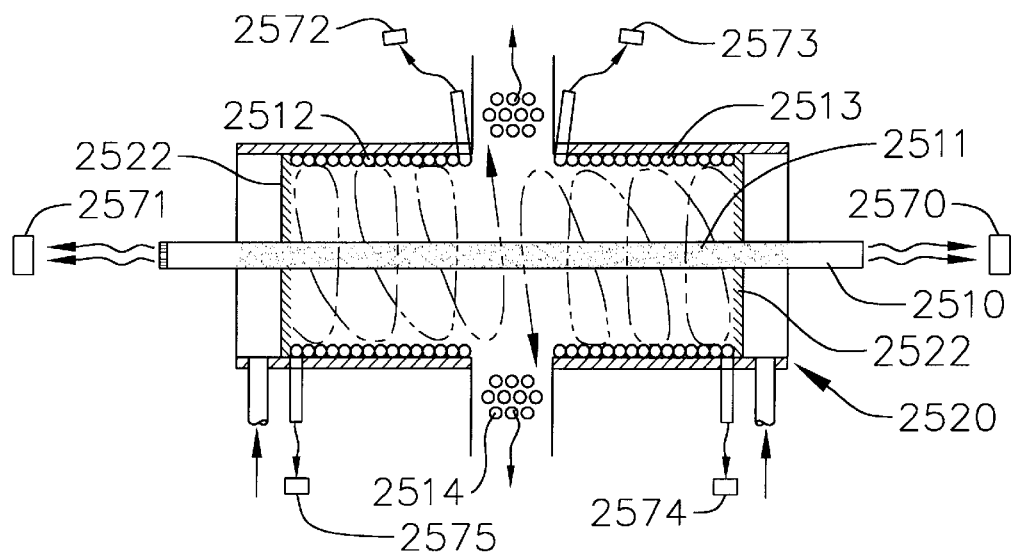
FIG. 25 is a schematic cross-sectional side view of a high efficiency multi-light pipe system.

FIG. 25 illustrates a similar design that comprises a vortex combustor 2520 and four light pipes (2510, 2512, 2513 and 2514). The combustible mixture delivery system in this design utilizes a louver-type distributive plate 2522. Other vortex-creating devices such as nozzles, slots, etc., can also be considered for such a combustion system. One rod type light pipe 2510 is installed at the center of the device, so it operates in a way similar to that described in FIG. 24. Three additional light pipes 2512, 2513 and 2514 cover the combustor walls and exhaust plenum. These light pipes are made as a coils. The light pipe which is installed inside of the exhaust plenum 2514 has a staggered structure so it minimizes photon losses through the exhaust plenum and utilizes the exhaust heat by converting this energy to narrow band IR radiation. It is possible to fabricate these light pipes of different superemitters in order to maximize the photon output for a particular temperature profile. The light pipes are configured to provide a narrow band photon output to respective targets or PV cells 2570, 2571, 2572, 2573, 2574 and 2575. This design is expected to be the most efficient and will be able to both pump the laser and generate electricity for different needs.

Figure 26:
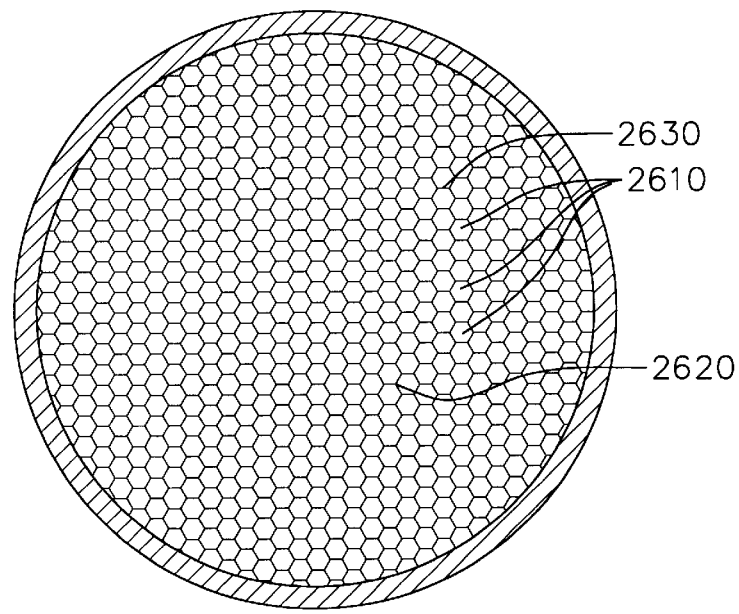
FIG. 26 is a radial cross-sectional end view of a microchannel combustion light pipe system.

FIG. 26 illustrates a microchannel combustion chamber 2620 comprising multiple light pipes 2610, which are installed into combustor. A benefit of such combustion device is an extremely high energy density (up to 100 W/cm$^2$). Combustion occurs in a space 2630 between the light pipes which is just slightly larger than the flame quenching distance. Because the flame is located in a close proximity to the light pipes, it creates the conditions for highly effective heat transfer from the flame to the light pipes. This design operates with a highly extended light pipe area, so that more photons are generated by light pipes having the same combustor volume.

Figure 27:
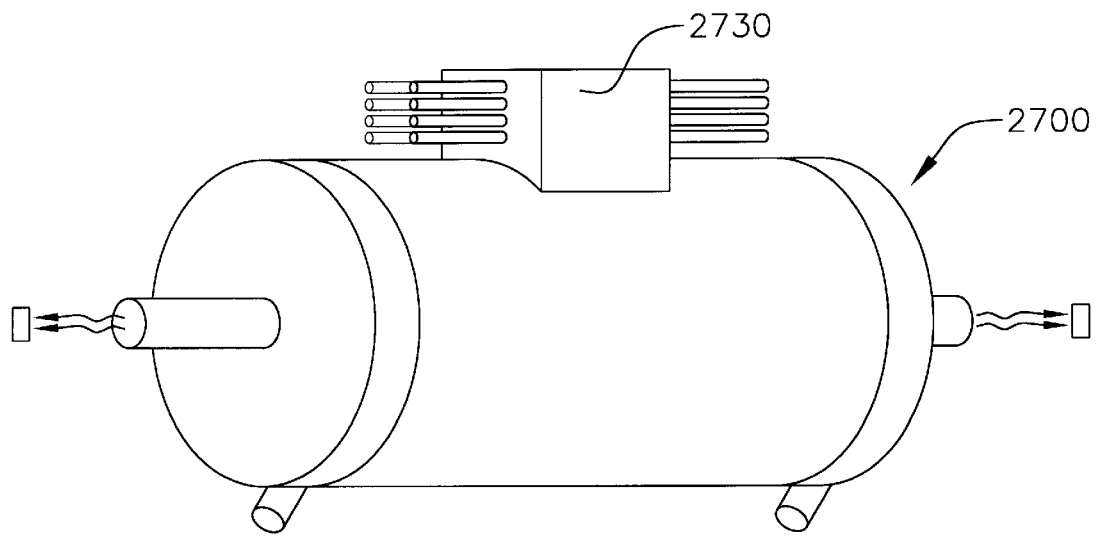
FIG. 27 is a perspective side view of a laser pumping/electric power generating light pipe system.

FIG. 27 exhibits a light pipe laser power system 2700 similar to that described in FIGS. 24 and 25, except that the exhaust plenum 2780 contains a set of light pipes which absorb energy from the hot exhaust and convert it to a narrow band photon emission. This additional photon flux can be utilized for different applications, including laser pumping, electric power generation, or other needs.

Figure 28:
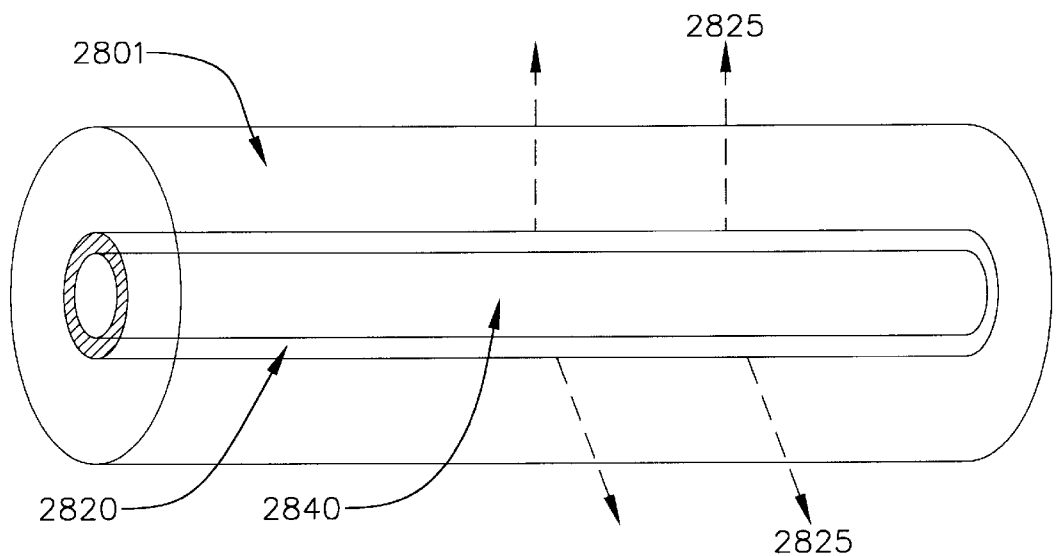
FIG. 28 is a schematic side view of a tubular light pipe with internal combustion chamber.

FIG. 28 shows a light pipe having a tubular structure where the combustion or heating source is at the center of a hollow tube 2801. The tube is made of optical materials chosen for the light pipe waveguide, such as YAG, sapphire and high temperature glass. The tube 2801 has dimensions of length L, outer diameter OD, and inner diameter ID. Typically, these dimensions for laser pumping are approximately L=13 to 20 cm, OD=5 mm, ID=3 mm; other dimensions are possible for different applications.

A hollow superemitter crystal insert or coating layer 2820, of approximately one mm thickness, is attached to the tube's internal surface, producing a hollow channel 2840 of approximately one mm diameter at the center of the tube. This internal channel 2840 is the combustion channel for heating the superemitter layer 2820. The hot combustion in the channel 2840 heats the superemitter layer 2820 which in turn emits selective thermal radiation 2825 outwardly through the transparent outer tube 2801. Light from the superemitter layer 2820 is total-internally reflected from the tube's outer surface and automatically directed back to the superemitter layer 2820, with it being absorbed by the layer 2820 providing further heat to the superemitter, and hence improving the tubular light pipe's overall light production efficiency.

In comparison with other light pipe designs, the transparent tube 2801 acts as the thermally insulating light guide. This tubular light pipe structure is ideal for replacing flash lamps in lasers without having to change the optical design of the laser, since the flash lamps are usually straight cylinders having usual dimensions of 13–20 cm in length and 5 mm in diameter.

Figure 29:
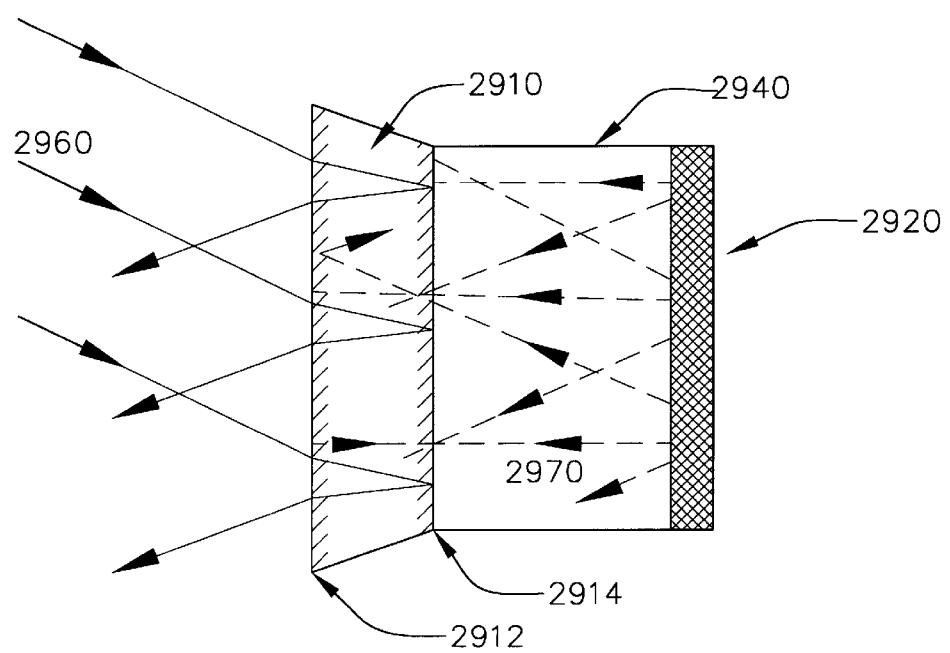
FIG. 29 is a schematic cross-sectional side view of a light pipe pumped active mirror laser amplifier.

FIG. 29 illustrates the light pipe pumping of an "active mirror" laser amplifier. The laser gain medium 2910 is pumped from one side while the laser light 2960 to be amplified is incident from the other side. The laser light 2960 is amplified upon internal reflection from the pumped disk at the back surface 2914, constituting the active-mirror configuration. The laser medium 2910 is a crystal or glass in the shape of a circular disk with slightly tapered edges, and has dielectric thin-film coatings 2912 and 2914 on both faces of the disk. The back surface coating 2914 is highly reflective for the laser light and antireflection (AR) coated for the pump light. The front surface coating 2912 is antireflection coated for the laser light 2960 and highly reflective for the pump light 2970. Thus the pump light 2970 double-passes the disk 2910 for more efficient pumping, and the laser light 2960 double-passes the disk 2910 for efficient laser energy extraction.

The disk 2910 usually has diameters from 3 to 6 cm. The active-mirror laser design [J. P. Chernoch, U.S. Pat. No. 3,466,569 (Sep. 9, 1969)] has been shown to be useful for large, high beam-quality, high efficiency, high repetition rate laser amplifiers. The large round clear aperture of the "active mirror" disk 2910 reduces the diffraction problems normally encountered in slab and rod laser amplifiers. The light pipe component used for pumping the active mirror is a cylindrical rod of the same diameter as the disk with a superemitter bonded or coated onto its back surface. Unlike flash lamps and laser diodes previously used for pumping, the light pipe pumping component is easily matched to the geometry of the active mirror.

The examples described and illustrated above are not intended to limit the scope of this invention, the novel use of light pipe pumped laser stimulation by means of superemitter materials within or adjacent to any type of waveguide for producing any selected photon sources for laser purpose is intended to be within the scope of the claims of this invention.

What is claimed is:

1. A laser emission stimulating system comprising:

a heat source;

a substantially solid light pipe comprising a photon emissive material disposed therein and that is exposed to the heat source for generating photons;

an optical waveguide adjacent the photon emissive material for guiding photons generated therefrom; and a laser disposed adjacent the optical waveguide to receive the photons for stimulating the laser to produce a laser emission.

2. The laser emission stimulating system as recited in claim 1 wherein the photon emissive material is selected to produce photons at a selected wavelength.

3. The laser emission stimulating system as recited in claim 1 wherein the heat source is selected from the group consisting of combustion, radiant, nuclear, radioisotopic, chemical, electrical, and mechanical heating sources.

4. The laser emission stimulating system as recited in claim 1 wherein the photon emissive material is independent from the waveguide.

5. The laser emission stimulating system as recited in claim 1 wherein the waveguide is part of the light pipe and the photon emissive material is disposed within the light pipe.

6. The laser emission stimulating system as recited in claim 5 wherein the light pipe comprises at least two photon emissive portions positioned in temperature regions providing optimal heat to photon conversion.

7. The laser emission stimulating system as recited in claim 5 further comprising an optical reflector at one end of the light pipe to permit passage of selected wavelength photons to the laser.

8. The laser emission stimulating system as recited in claim 7 further comprising a target disposed at an end of the light pipe opposite the optical reflector.

9. The laser emission stimulating system as recited in claim 5 comprising a number of light pipes positioned to provide photons to the laser.

10. The laser emission stimulating system as recited in claim 9 wherein the light pipes provide photons to at least one target other than the laser.

11. The laser emission stimulating system as recited in claim 1 wherein the waveguide directs photons parallel to the laser emission.

12. The laser emission stimulating system as recited in claim 1 wherein the waveguide directs photons perpendicular to the laser emission.

13. A laser emission stimulating system comprising:

a thermal energy generating source;

a substantially solid light pipe comprising a photon emissive material disposed therein that is exposed to the thermal energy generating source for generating photons therefrom;

a laser device in communication with the light pipe for receiving the photons to stimulate the laser device to produce a laser emission.

14. The laser emission stimulating system as recited in claim 13 wherein the photon emissive material is selected to produce photons at a desired wavelength.

15. The laser emission stimulating system as recited in claim 13 comprising a number of light pipes that are arranged to direct photons to the laser device.

16. The laser emission stimulating system as recited in claim 13 further comprising an optical filter disposed between the light pipe and laser device to maintain photons delivered to the laser device at a desired wavelength.

17. The laser emission stimulating system as recited in claim 13 further comprising an optical waveguide disposed between the light pipe and the laser device.

18. The laser emission stimulating system as recited in claim 13 further comprising a target disposed adjacent an end of the light pipe opposite from the laser device.

19. The laser emission stimulating system as recited in claim 18 further comprising an optical reflector at the end of the light pipe adjacent the laser device for directing photons through the target and to the target.

20. The laser emission stimulating system as recited in claim 18 wherein the target is selected from the group consisting of a laser device and a photovoltaic cell.

21. The laser emission stimulating system as recited in claim 13 wherein the photon emissive material produces photons having multiple specific wavelengths for directing to the laser device and other targets having a specific photon wavelength input.

22. A device that produces photons within a substantially solid optical waveguide that comprises a photon emissive material disposed therein when thermal energy is applied to at least a portion of the waveguide, and that directs the photons to a laser emission generating source.

23. A laser emission stimulating system comprising:

a thermal energy generating source;

a substantially solid photon generating source comprising photon emissive material exposed to the thermal energy generating source for producing photons upon exposure to thermal energy;

a laser emission source exposed to the photon generating source for providing a laser emission in response to photon stimulation; and an optical waveguide interposed between the photon generating source and the laser emission source.

24. The laser emission stimulating system as recited in claim 23 wherein the thermal energy generating source is selected from the group consisting of combustion, radiant, nuclear, radioisotopic, chemical, electrical, and mechanical heating sources.

25. The laser emission stimulating system as recited in claim 23 wherein the photon emissive material is selected to produce photons at a desired wavelength.

26. The laser emission stimulating system as recited in claim 23 wherein the laser emission source is in the form of liquid solution.

27. A method for stimulating a laser emission comprising:

producing sufficient thermal energy to cause a photon emission from a substantially solid photon emitting device comprising a photon emissive material disposed therein and that is exposed to such thermal energy; and directing the photons through an optical waveguide to a laser emission generating source to stimulate the laser generating source to produce a particular wavelength laser emission.

* * * * *